United States Patent
Hughes et al.

(10) Patent No.: US 12,521,527 B2
(45) Date of Patent: Jan. 13, 2026

(54) STEERABLE CATHETER DEVICE

(71) Applicant: Medtronic Vascular, Inc., Santa Rosa, CA (US)

(72) Inventors: Celia E. Hughes, Galway (IE); Michael J. Deane, MO (IE)

(73) Assignee: MEDTRONIC VASCULAR, INC., Santa Rosa, CA (US)

( * ) Notice: Subject to any disclaimer, the term of this patent is extended or adjusted under 35 U.S.C. 154(b) by 1054 days.

(21) Appl. No.: 17/333,426

(22) Filed: May 28, 2021

(65) Prior Publication Data

US 2022/0379091 A1    Dec. 1, 2022

(51) Int. Cl.
*A61M 25/01* (2006.01)
*A61F 2/24* (2006.01)

(52) U.S. Cl.
CPC ....... *A61M 25/0147* (2013.01); *A61F 2/2427* (2013.01)

(58) Field of Classification Search
CPC .......... A61M 25/0147; A61M 25/0136; A61M 25/0074
See application file for complete search history.

(56) References Cited

U.S. PATENT DOCUMENTS

| | | | |
|---|---|---|---|
| 5,395,329 A | | 3/1995 | Fleischhacker et al. |
| 5,987,344 A | * | 11/1999 | West .................. A61M 25/0144 606/41 |
| 6,228,032 B1 | * | 5/2001 | Eaton .................... A61B 1/0052 600/463 |
| 6,554,794 B1 | * | 4/2003 | Mueller ............ A61M 25/0141 604/95.04 |
| 8,641,604 B2 | | 2/2014 | Golden et al. |
| 8,676,290 B2 | * | 3/2014 | Tegg ...................... A61B 5/283 606/41 |
| 9,737,688 B2 | * | 8/2017 | Furnish ............. A61M 25/0147 |

(Continued)

FOREIGN PATENT DOCUMENTS

| | | |
|---|---|---|
| WO | 94/11057 A1 | 5/1994 |
| WO | 2006/039216 A1 | 4/2006 |

OTHER PUBLICATIONS

European Extended Search Report for corresponding Application No. 22174786.8, Nov. 2, 2022, 11 pages, Munchen, Germany.

*Primary Examiner* — Bhisma Mehta
*Assistant Examiner* — Adam J. Cermak
(74) *Attorney, Agent, or Firm* — Stinson LLP

(57) ABSTRACT

A steerable catheter device including a catheter, first and second steering wires, and a steering control unit. The steering wires are connected to and extend from the catheter. The steering control unit includes a first actuator member, a first output member, a second actuator member, and a second output member. The first output member is threadably connected to the first actuator member. The second output member is threadably connected to the second actuator member. A portion of the first actuator member is disposed within the second actuator member. The first output member translates with rotation of the first actuator member and the second output member translates with rotation of the second actuator member. The first steering wire is attached to the first output member and the second steering wire is attached to the second output member. Tension in the steering wires can be independently adjusted.

17 Claims, 27 Drawing Sheets

(56) References Cited

U.S. PATENT DOCUMENTS

| | | | |
|---|---|---|---|
| 10,357,634 B2 | 7/2019 | Simmons et al. | |
| 10,661,057 B2* | 5/2020 | Davies | A61M 25/0136 |
| 10,675,442 B2 | 6/2020 | Douglas et al. | |
| 10,709,870 B2* | 7/2020 | Scheibe | A61M 25/0147 |
| 10,786,651 B2 | 9/2020 | Edminster et al. | |
| 10,799,675 B2 | 10/2020 | Khuu et al. | |
| 11,040,174 B2* | 6/2021 | Khuu | A61B 1/0057 |
| 11,666,733 B2* | 6/2023 | Maini | A61M 25/0136 604/528 |
| 2006/0100640 A1* | 5/2006 | Bolduc | A61B 17/00234 606/108 |
| 2011/0282176 A1* | 11/2011 | Tegg | A61M 25/0136 604/95.04 |
| 2012/0041387 A1* | 2/2012 | Bruggemann | A61M 5/14546 604/218 |
| 2012/0089125 A1* | 4/2012 | Scheibe | A61M 25/0147 604/523 |
| 2013/0012925 A1 | 1/2013 | Berthiaume et al. | |
| 2013/0030520 A1* | 1/2013 | Lee | A61F 2/2433 623/2.11 |
| 2016/0331932 A1* | 11/2016 | Davies | A61M 25/0147 |
| 2017/0143940 A1* | 5/2017 | Flygare | A61M 25/0136 |
| 2017/0258614 A1 | 9/2017 | Griffin | |
| 2018/0104452 A1* | 4/2018 | Goodman | A61B 17/3468 |
| 2018/0154114 A1* | 6/2018 | Tang | A61M 39/06 |
| 2018/0264231 A1* | 9/2018 | Scheibe | A61M 25/0133 |
| 2018/0296798 A1* | 10/2018 | Lepak | A61M 25/0136 |
| 2019/0038873 A1* | 2/2019 | Schultheis | A61M 25/0136 |
| 2021/0060297 A1* | 3/2021 | Muldoon | A61M 25/0113 |
| 2021/0100981 A1* | 4/2021 | Maini | A61M 25/0136 |
| 2022/0387757 A1* | 12/2022 | Wang | A61M 25/0662 |
| 2023/0001150 A1* | 1/2023 | Tang | A61B 50/20 |

\* cited by examiner

STEERABLE CATHETER DEVICE

BACKGROUND

The present disclosure relates to steerable catheters. More particularly, it relates to steering control mechanisms for steerable catheter devices (such as a steerable introducer).

Catheters of many types are used in a wide variety of medical procedures. For example, catheters can be employed to deliver therapy to (e.g., deliver a therapeutic device), and/or monitor conditions at locations within the body, for example by inserting the catheter into a major vein or artery or other bodily lumen. As a point of reference, the catheter or catheter device can alternatively be referred to as an introducer or an access sheath. The catheter will have sufficient flexibility to maneuver through the vasculature of the patient, and a handle is often affixed to such devices to facilitate user manipulation of the catheter during insertion and advancement.

Steerable catheters are available that afford the user the ability to steer or control articulation of a distal tip of the catheter. With a conventional steerable catheter device, steering wires or pull wires are attached to the distal tip, extend through a length of the catheter, and are connected to an actuator carried by the handle. Tension applied to the steering wires can cause the distal tip to deflect. Conventional steering control mechanisms and corresponding steerable catheter devices provide for controlled deflection of the catheter distal tip in a single plane.

SUMMARY

The inventors of the present disclosure recognized that a need exists for improvements in steerable catheters and steering control units or mechanisms for steerable catheters.

Some aspects of the present disclosure relate to a steerable catheter device. The steerable catheter device include a catheter, first and second steering wires, and a steering control unit. The catheter defines a distal region opposite a proximal region. The first and second steering wires are connected to the catheter and extending from the proximal region. The steering control unit includes a first actuator member, a first output member, a second actuator member, and a second output member. The first actuator member includes a post defining a threaded surface. The first output member is threadably connected to the threaded surface of the post. The second actuator member includes a hub defining a passageway and a threaded surface. The second output member is threadably connected to the threaded surface of the hub. At least a portion of the post is disposed within the passageway of the hub. The first output member translates with rotation of the first actuator member and the second output member translates with rotation of the second actuator member. Finally, the first steering wire is attached to the first output member and the second steering wire is attached to the second output member.

With this construction, the steering control region is operable by a user to deflect or articulate at least a portion of the catheter, for example the distal region, in at least two directions or planes via independently applied or released tension along the first and second steering wires. The first actuator member can be rotated to translate the first output member and adjust tension in the first steering wire; the second output member remains stationary with this movement and thus tension, if any, in the second steering wire does not change. The second actuator member can be rotated to translate the second output member and adjust tension in the second steering wire; the first output member remains stationary with this movement and thus tension, if any, in the first steering wire does not change. Where the steering wires are attached to the catheter at different locations relative to a circumference of the catheter (e.g., approximately 90 degrees relative to one another), deflection or articulation of the catheter can be controlled in at least two different planes. In some embodiments, the first actuator member and the first output device combine to define a first functional assembly, and the second actuator member and the second output device combine to define a second functional assembly. With these and related embodiments, the first and second functional assemblies are concentrically arranged.

Other aspects of the present disclosure relate to a steering control unit for a steerable catheter device including a catheter and first and second steering wires. The steering control unit includes a first actuator member, a first output member, a second actuator member, and a second output member. The first actuator member includes a post defining a threaded surface. The first output member is threadably connected to the threaded surface of the post, and is configured for attachment to the first steering wire. The second actuator member includes a hub defining a passageway and a threaded surface. The second output member is threadably connected to the threaded surface of the hub, and is configured for attachment to the second steering wire. At least a portion of the post is disposed within the passageway of the hub. The first output member translates with rotation of the first actuator member and the second output member translates with rotation of the second actuator member.

DETAILED DESCRIPTION

Specific embodiments of the present disclosure are now described with reference to the figures, wherein like reference numbers indicate identical or functionally similar elements. The terms "distal" and "proximal" are used in the following description with reference to a position or direction relative to a treating clinician. "Distal" or "distally" are a position distant from or in a direction away from the clinician. "Proximal" or "proximally" are a position near or in a direction toward the clinician.

Aspects of the disclosure are directed to steerable catheter devices and steering control mechanisms for steerable catheter devices. The steerable catheter devices of the present disclosure are useful with a plethora of different medical procedures. In some non-limiting examples, the steerable catheter devices of the present disclosure can be useful as a steerable introducer accessory as part of a transcatheter aortic valve replacement procedure. Other aspects of the present disclosure are directed to a medical system that includes the steerable catheter device and an elongate medical device configured to be received within a delivery lumen of the steerable catheter device.

Figure 1:
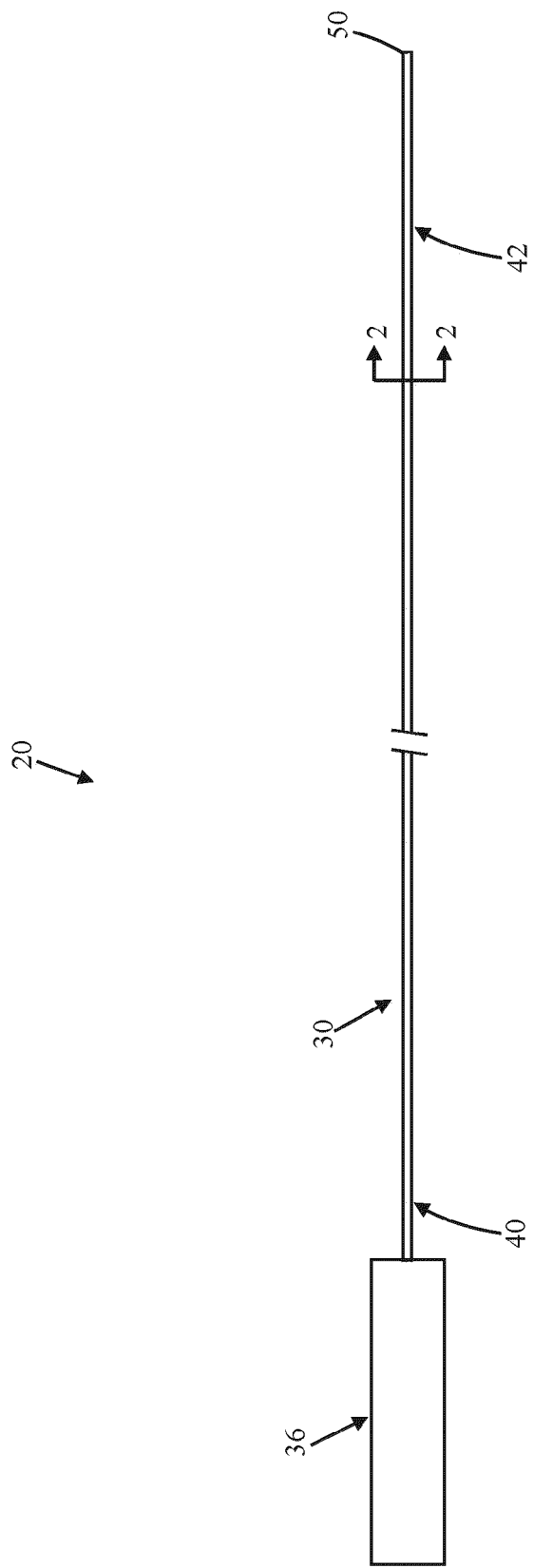
FIG. 1 is a simplified side view of a steerable catheter device in accordance with principles of the present disclosure.
Figure 2:
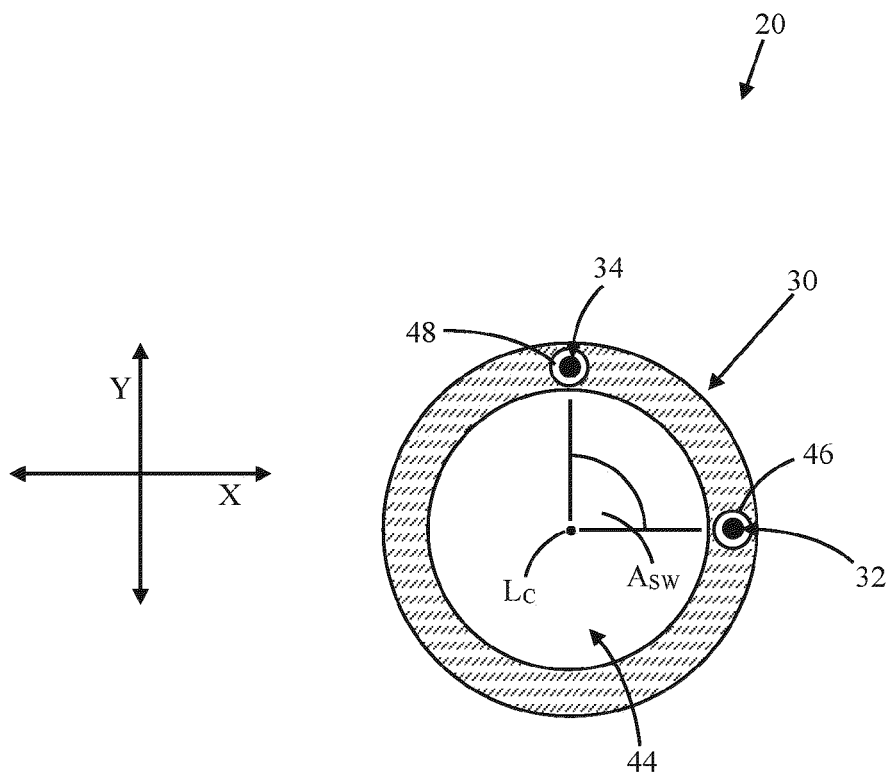
FIG. 2 is a cross-section of the steerable catheter device of FIG. 1, taken along the line 2-2.

One example of a steerable catheter device 20 in accordance with principles of the present disclosure is shown in simplified form in FIGS. 1 and 2. The steerable catheter device 20 includes a catheter 30, two or more steering wires, such as first and second steering wires 32, 34, and a steering control unit or mechanism 36. Details on the various components are provided below. In general terms, a proximal region 40 of the catheter 30 is connected to the steering control unit 36 and extends therefrom to a distal region 42. Further, the catheter 30 defines one or more lumens, such as a central lumen 44 and first and second steering wire lumens 46, 48. The first and second steering wires 32, 34 are disposed within a respective one of the steering wire lumens 46, 48. A distal end of each of the steering wires 32, 34 is fixed to the catheter, for example along the distal region 42. A proximal end of each of the steering wires 32, 34 is secured to a respective component of the steering control unit 36 as described below. The steering control unit 36 can be provided as part of a handle assembly that may include additional features useful with the steerable catheter device 20. Regardless, the steering control mechanism 36 is operable by a user to deflect or articulate at least a portion of the catheter 30, for example the distal region 42, via applied or released tension along the steering wires 32, 34. In particular, the steering control unit 36, in conjunction with an arrangement of the steering wires 32, 34 relative to the catheter 30, is configured to effect independent articulation or deflection of the distal region 42 in at least two directions or planes. For example, and as identified in FIG. 2, the steering control unit 36 is operable to adjust tension in the first steering wire 32 that in turn affects articulation or deflection of the catheter 30 in the X direction, and is also operable to adjust tension in the second steering wire 34 that in turn affects articulation or deflection of the catheter 30 in the Y direction. In some embodiments, the X and Y directions are perpendicular to one another. In some embodiments, the steering control unit 36 forms a lumen (not shown) open to the central lumen 44, with the lumens combining to define a delivery lumen of the steerable catheter device 20 and through which an elongate medical device (not shown) can be advanced.

The catheter 30 can have any form conventionally employed for catheter-type procedures, and is typically a flexible tube formed, for example, using standard flexible, medical grade plastic materials or polymers (e.g., polyethylene, polyethylene block amide copolymer (PEBA), polyether black amide copolymer, polyamide and/or combinations thereof, either laminated, blended or co-extruded). As used throughout the present disclosure, the term "catheter" is synonymous with the terms "introducer", "sheath", "guide catheter", and "delivery catheter". The catheter 30, while flexible, may have a plastic memory or bias the normally orients the distal region 42 in an essentially straight configuration. In other embodiments, the catheter 30 can be formed to assume or be biased toward a curved configuration (e.g., a curve or bend is formed along a length of the catheter 30 in extension from the proximal region 40 to the distal region 42).

While the catheter 30 has been generally illustrated as having a uniform construction, outer diameter and wall thickness along a longitudinal length thereof, in other embodiments, one or more of the construction, outer diameter, and wall thickness can be variable. By way of non-limiting example, in some embodiments the proximal region 40 can be formatted to be less flexible or more rigid than the distal portion 42 (e.g., a wire braiding or other reinforcement layer can be embedded into or formed about a tubular main body along only the proximal region 40) or vice-versa. Other multi-part constructions are also acceptable. An outer diameter of the catheter 30 can taper in a direction of the distal region 42 or vice-versa. A larger diameter feature can be formed at the distal region 42 (e.g., the distal region 42 can form a capsule for containing a device to be delivered inside the patient). The wall thickness can vary to impart enhanced or decreased flexibility at one or both of proximal region 40 and the distal region 40. In short, any catheter configuration, construction or design useful for a particular medical procedure can be employed as the catheter 30 of the present disclosure.

The central lumen 44 can be open to a distal end 50 of the catheter 30, and can extend the entire length of the catheter 30 (i.e., from a proximal end (hidden) of the catheter 30 to the distal end 50). The central lumen 44 can be sized and shaped or otherwise configured to slidably receive a medical device such as guide wire, a treatment catheter (e.g., a transcatheter delivery device loaded with a replacement or prosthetic heart valve such as a prosthetic aortic valve), any elongated vascular device such as a delivery system that carries a vascular implant, etc., there-through when the steerable catheter device 20 is configured to be an introducer device or a guide catheter device. In other embodiments, the central lumen 44 is sized and shaped or otherwise configured to house an inner shaft component or the like when the catheter 30 is configured to be an outer component of a treatment or delivery catheter. In yet other embodiments, additional lumens (i.e., in addition to the central lumen 44 and the steering wire lumens 46, 48) can be provided.

The steering wire lumens 46, 48 can extend longitudinally along the catheter 30, for example parallel to the central lumen 44. The steering wire lumens 46, 48 can terminate proximal to the distal end 50. The steering wire lumens 46, 48 are sized and shaped or otherwise configured to slidably receive a corresponding one of the steering wires 32, 34. Although depicted as circular in transverse cross-section, one or both of the steering wire lumens 46, 48 can have different configurations or shapes. For example, one or both of the steering wire lumens 46, 48 can have an oval or oblong cross-sectional shape. Further, the catheter 30 can optionally incorporate or include features or components that promote sliding of the steering wires 32, 34, reinforce the steering wire lumens 46, 48, etc. For example, a surface of one or both of the steering wire lumens 46, 48 can be coated with a material or liner providing a low friction interface with the corresponding steering wire 32, 34; a tube (e.g., a hypotube) formed of a material differing from that of the main body of the catheter 30 can be placed inside each of the steering wire lumens 46, 48 and within which the corresponding steering wire 32, 34 is slidably disposed, etc.

The steering wires 32, 34 can each assume any form useful as a steering catheter pull wire (e.g., a wire, filament, rope or cord exhibiting longitudinal rigidity; all of these alternatives being within, but not necessarily exhausting, the scope of the term "wire"). For example, the steering wires 32, 34 can each be formed from metal (e.g., stainless steel), metal fiber strands, polymer(s) such as Kevlar™, or other relatively hard polymer material(s), etc. The steering wires 32, 34 can each be attached at a distal end thereof to the catheter 30 in various manner (e.g., bonding, adhesive, welding, an intermediate body secured to the steering wire 32, 34 and a wall of the catheter 30, etc.). Regardless, and as reflected by FIG. 2, in some embodiments, a point of attachment of the first steering wire 32 relative to transverse cross-sectional shape of the catheter 30 is circumferentially off-set from that of the second steering wire 34. For example, the catheter 30 can be viewed as defining a longitudinal center line $L_C$. In a plane perpendicular to the longitudinal center line $L_C$, a point of the attachment of the first steering wire 32 to the catheter 30 and a point of attachment of the second steering wire to the catheter 30 combine to define a central angle (convex central angle) $A_{SW}$. In some embodiments, the central angle $A_{SW}$ is in the range of 60°-120°, alternatively in the range of 80°-100°, alternatively in the range of 85°-95°. With these and related embodiments, then, tension in the first steering wire 32 affects articulation or deflection of the catheter 30 primarily, optionally exclusively, in the X direction, and tension in the steering wire 34 affects articulation or deflection of the catheter 30 primarily, optionally exclusively, in the Y direction.

With the above, general descriptions of the catheter 30 and the steering wires 32, 34 in mind, the steering control unit 36 can assume various capable of providing a user or clinician with the ability to manually, independently actuate the first steering wire 32 and the second steering wire 34. In some embodiments, the steering control unit 36 has a compact format or footprint, promoting, for example, use of the steerable catheter device 20 as an introducer device (i.e., the steering control unit 36 is relatively short and presents minimal impediments to a separate device being inserted into and advanced relative to the steerable catheter device 20).

Figure 3:
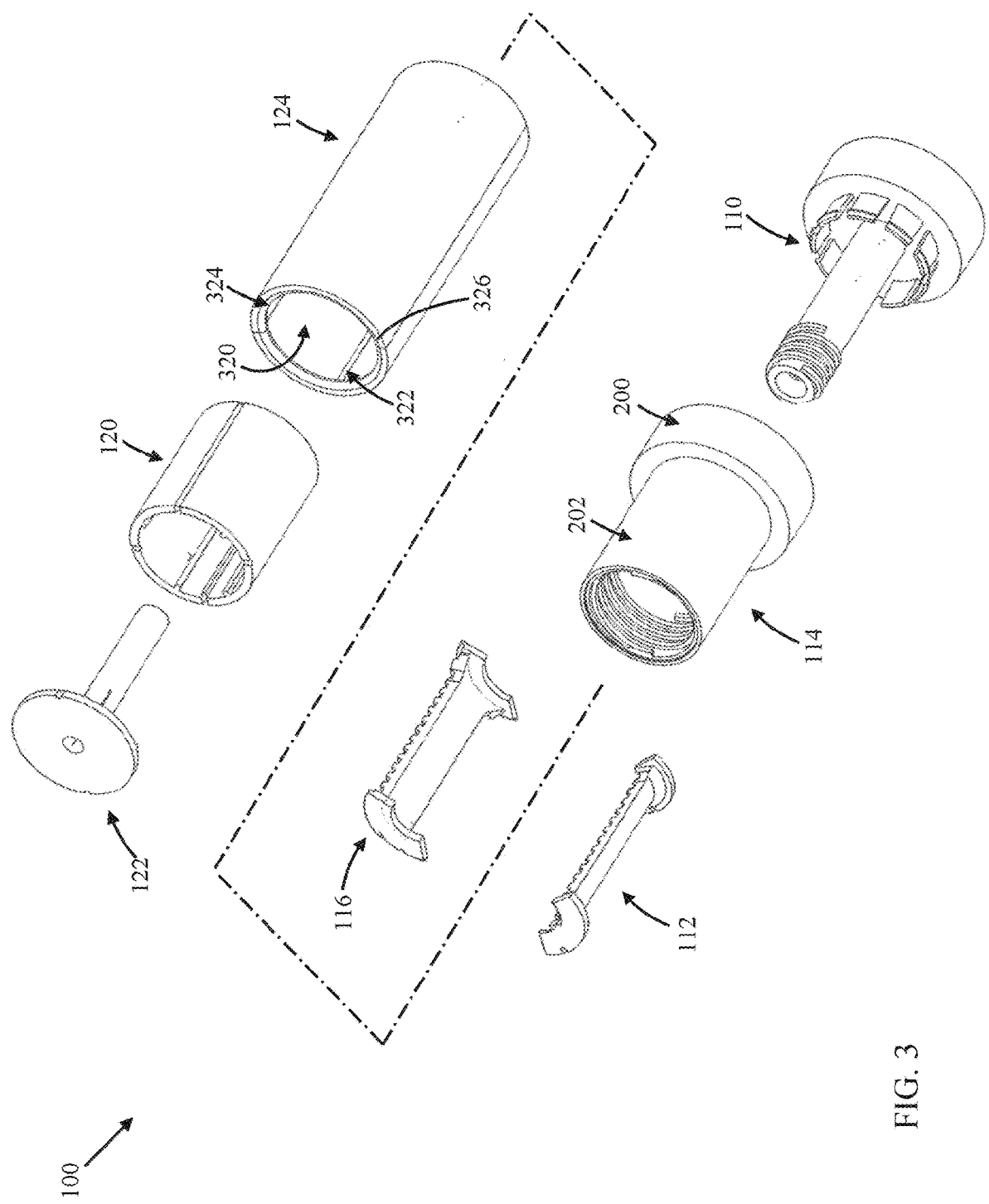
FIG. 3 is an exploded, perspective view of a steering control unit in accordance with principles of the present disclosure and useful with the steerable catheter device of FIG. 1.

One example of a steering control unit 100 in accordance with principles of the present disclosure and useful with the steering catheter devices of the present disclosure, such as the steering control unit 36 (FIG. 1), is shown in FIG. 3. The steering control unit 100 includes a first actuator member 110, a first output member 112, a second actuator member 114, and a second output member 116. The components 110-116 can be maintained or assembled relative to one another in various fashions that facilitate the functions described below; with the non-limiting example of FIG. 3, a collar 120, a cover 122 and an outer housing 124 can optionally be provided, along with an optional cap (not shown). Regardless, and in general terms, the first actuator member 110 is threadably connected to the first output member 112, and the second actuator member 114 is threadably connected to the second output member 116. The first output member 112 is retained such that first output member 112 translates, for example linear translation, with rotation of the first actuator member 110. Similarly, the second output member 116 is retained such that second output member 116 translates, for example linear translation, with rotation of the second actuator member 114. With additional reference to FIGS. 1 and 2, upon final assembly, the first steering wire 32 is attached to the first output member 112 and the second steering wire 34 is attached to the second output member 116. With this construction, rotation of the first actuator member 110 affects tension in the first steering wire 32 via movement of the first output member 112, and rotation of the second actuator member 114 affects tension in the second steering wire 34 via movement of the second output member 116.

Figure 4A:
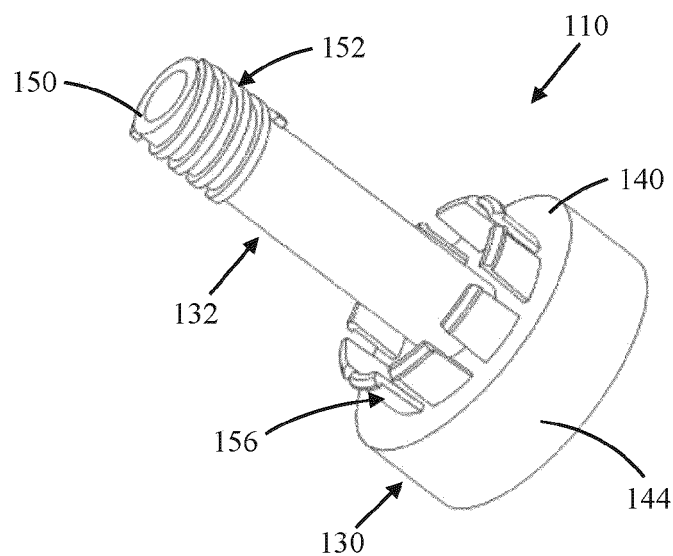
FIG. 4A is a perspective view of a first actuator member useful with the steering control unit of FIG. 3.
Figure 4B:
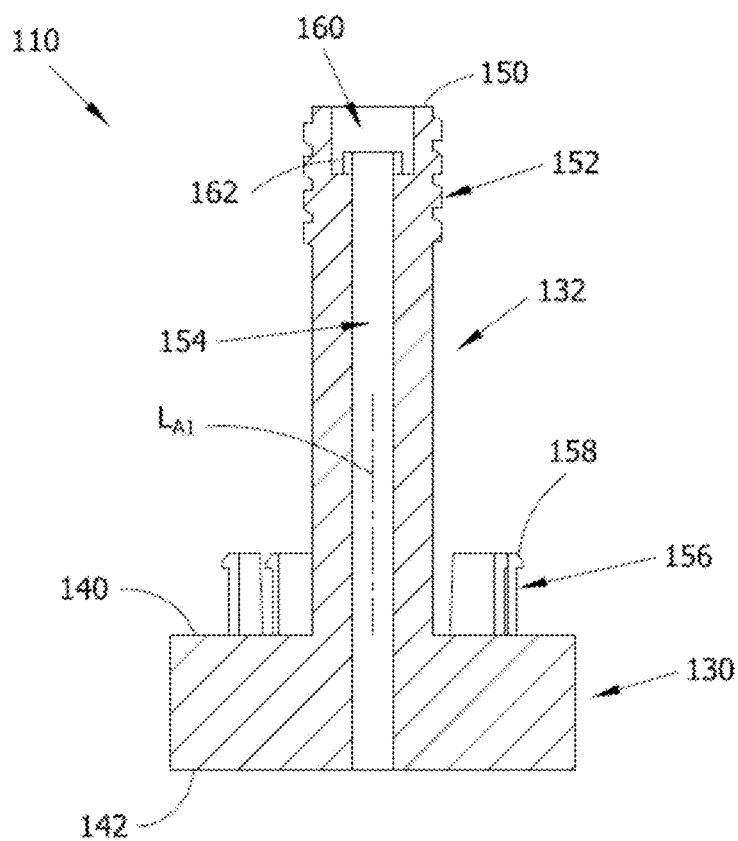
FIG. 4B is a longitudinal cross-sectional view of the first actuator member of FIG. 4A.

The first actuator member 110 is shown in greater detail in FIGS. 4A and 4B, and includes or defines a base 130 and a post 132. A shape of the first actuator member 110, for example extension of the post 132 from the base 130, defines a central longitudinal axis LAI The base 130 can have a cylindrical shape, and defines a leading face 140 opposite a trailing face 142, and side face 144. As made clear below, a user interfaces with the base 130, and in particular the side face 144, in applying a rotational force onto the first actuator member 110. With this in mind, while the side face 144 is illustrated as being relatively smooth, in other embodiments, features can be incorporated into or formed by the side face 144 that facilitate user interaction. For example, indents, protrusions, texturing, etc., can be formed by or applied to the side face 144 that promote grasping or other tactile interface by a user's hand or fingers.

The post 132 projects from the leading face 140 of the base 130 to a leading end 150. The post 132 can have a cylindrical shape, with an outer diameter of the post 132 being less than an outer diameter of the base 130. A threaded surface 152 is formed along an external surface of the post 132 adjacent the leading end 150. The threaded surface 152 can be, or can be akin to, a screw thread, forming a helix traversing from a location at or near the leading end 150 and winding toward the base 130.

In some embodiments, the post 132 forms a lumen 154 extending along the central longitudinal axis $L_{A1}$ and open to the leading end 150. Where provided, the lumen 154 can further extend through the base 130 and is open at the trailing face 142. With these and related embodiments, the lumen 154 can be sized and shaped or otherwise configured to slidably receive an elongated device intended to be inserted through the steerable catheter device 20 (FIG. 1); for example, the lumen 154 can be sufficiently sized to slidably receive a transcatheter heart valve delivery device in some non-limiting embodiments.

The first actuator member 110 can include or provide one or more features or components that promote assembly of the steering control unit 36 (FIG. 3). For example, one or more clips 156 can extend from the leading face 140 at locations concentric with the central longitudinal axis $L_{A1}$. The clips 156 each form an outwardly extending head 158 or similar feature spaced from the leading face 140 and configured for connection with a corresponding feature of the second actuator member 114 (FIG. 3) as described below. Further, a pocket 160 can be defined by the post 132, extending from the leading end 150, and an inner rim 162 can be defined within the pocket 160. The pocket 160 represents an increased size or diameter of the lumen 154, and combines with the rim 162 to receive a corresponding feature of the cover 122 (FIG. 3) as described below. Assembly of the steering control unit 36 can be accomplished in a variety of other manners that may or may not entail the clips 156 and/or the pocket 160; in yet other embodiments, the first actuator member 110 can incorporate one or more additional assembly-related features.

Figure 5A:
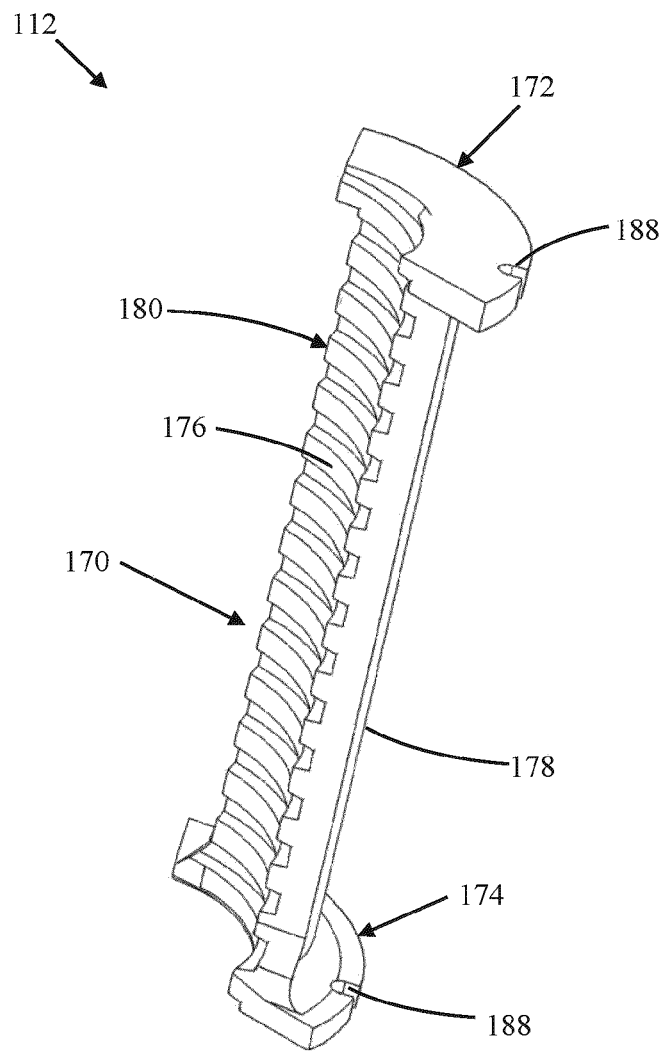
FIG. 5A is a perspective view of a first output member useful with the steering control unit of FIG. 3.
Figure 5B:
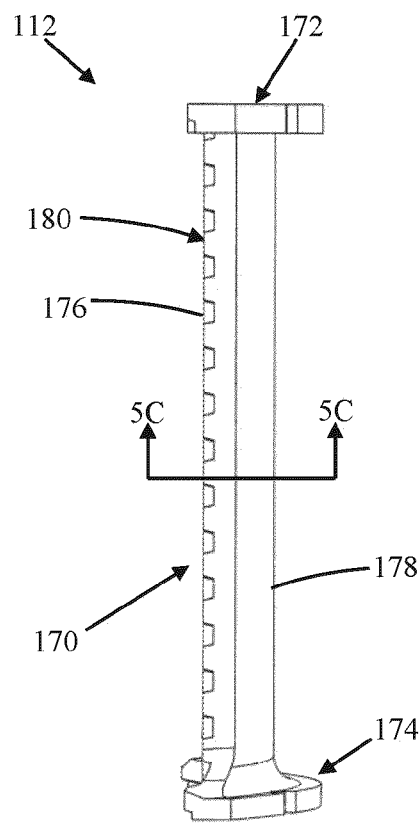
FIG. 5B is a side view of the first output member of FIG. 5A.
Figure 5C:
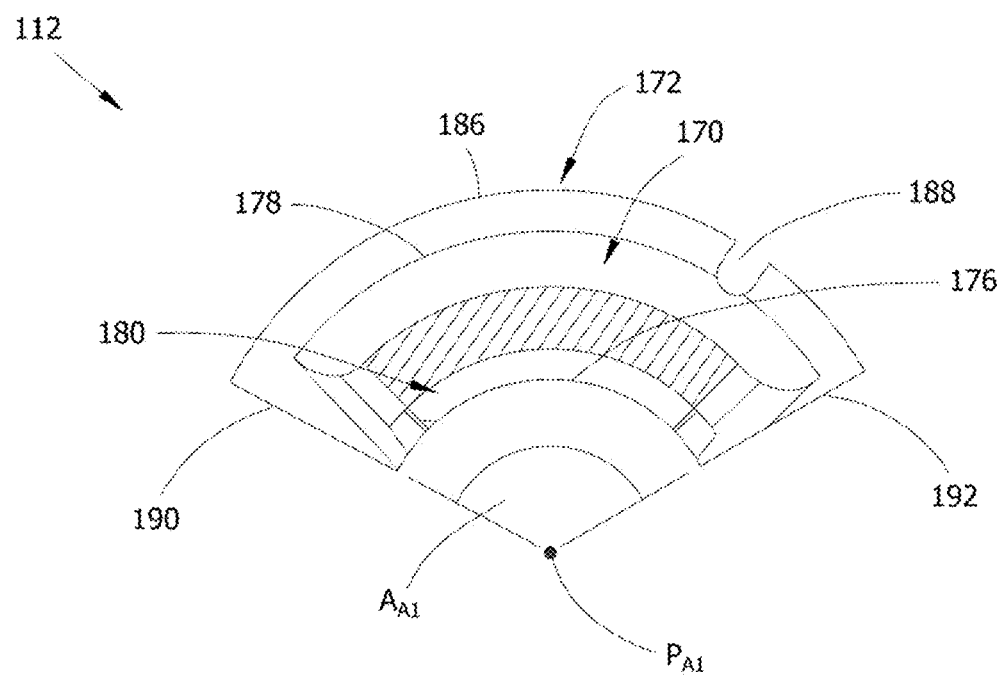
FIG. 5C is a cross-sectional view of the first output member of FIG. 5B, taken along the line 5C-5C.

The first output member 112 is shown in greater detail in FIGS. 5A-5C, and generally includes a partial gear body 170, an upper flange 172 and a lower flange 174. The partial gear body 170 defines an internal face 176 opposite an external face 178. Screw threads 180 are formed or defined in or on the internal face 176. A pitch of the screw threads 180 corresponds with that of the threaded surface 152 (FIG. 4A) of the post 132 (FIG. 4A). As best shown in FIG. 5C, the internal face 176 defines a substantially uniform (i.e., within 5% of truly uniform) curve in extension between opposing sides. The curve is an arc of a circle revolving about a center point $P_{A1}$, and is less than one-half of a complete circle. In some embodiments, the external face 178 of the partial gear body 170 can also define a similar, substantially uniform curve, revolving about the center point $P_{A1}$. Because the curved internal face 176, and thus the screw threads 180 formed thereby, is less than a complete circle, the partial gear body 170 serves as a partial or incomplete gear.

The flanges 172, 174 can be similar in shape, each projecting radially outwardly from the partial gear body 170 at opposite ends thereof, terminating at an exterior guide face 186 (identified for the upper flange 172 in FIG. 5C). In some embodiments, the exterior guide face 186 defines a substantially uniform curve similar to, and concentric with, that of the internal face 176, revolving about the center point $P_{A1}$. One or both of the flanges 172, 174 can optionally form a notch 188 in the exterior guide face 186 that extends through a thickness of the corresponding flange 172, 174 and configured to interface with a corresponding feature of the collar 120 (FIG. 3) as described below. Other interface constructions are also acceptable that may or may not include the notch 188. In yet other embodiments, one or both of the flanges 172, 174 can be omitted.

One or both of the flanges 172, 174 can extend circumferentially beyond one or both of the sides of the partial gear body 170. Thus, in some embodiments, a circumferential extent or footprint of the first output member 112 is defined by the flanges 172, 174, for example by the opposing side edges 190, 192 of the upper flange 172 as identified in FIG. 5C. In other embodiments, the circumferential extent or footprint of the first output member 112 can be defined by the partial gear body 170. Regardless, a central angle (convex central angle) $A_{A1}$ defined by the circumferential extent of the first output member 112 (e.g., curved extension between opposing side edges 190, 192) is less than 180°, alternatively less than 150°, and in some embodiments is in the range of 60°-150°.

Figure 6A:
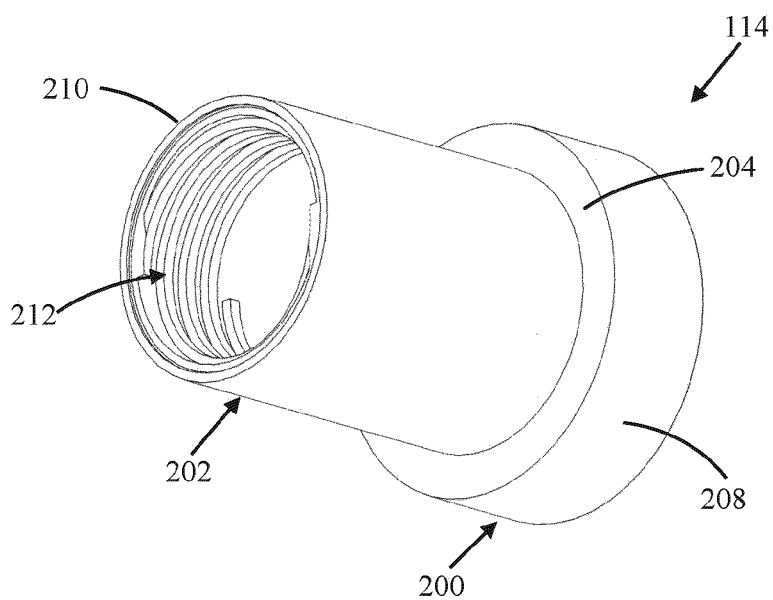
FIG. 6A is a perspective view of a second actuator member useful with the steering control unit of FIG. 3.
Figure 6B:
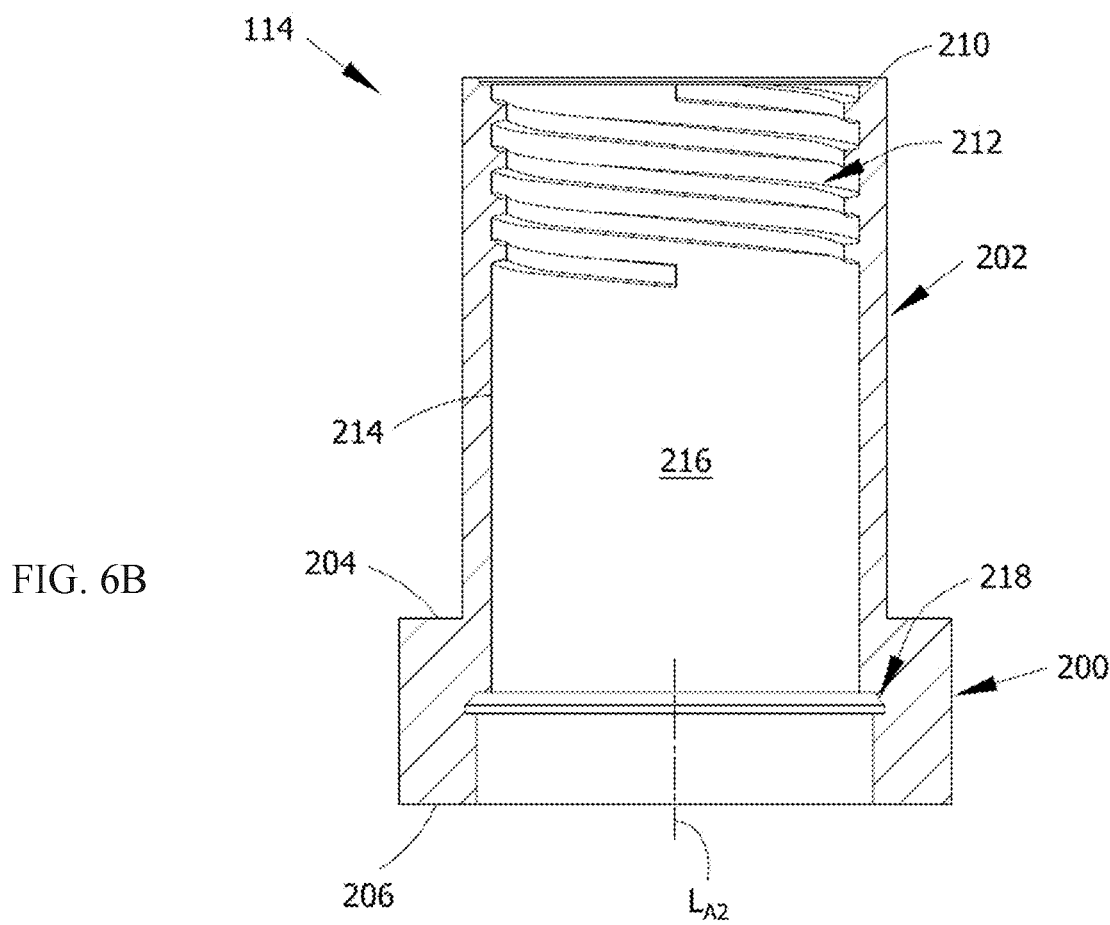
FIG. 6B is a longitudinal cross-sectional view of the second actuator member of FIG. 6A.

The second actuator member 114 is shown in greater detail in FIGS. 6A and 6B, and includes or defines a foot 200 and a hub 202, which hub 202 in some embodiments can comprise a tube, or generally tubular member, with a threaded surface. A shape of the second actuator member 114, for example extension of the hub 202 from the foot 200, defines a central longitudinal axis $L_{A2}$. The foot 200 can have a cylindrical shape, and defines a leading face 204 opposite a trailing face 206, and side face 208. As made clear below, a user interfaces with the foot 200, and in particular the side face 208, in applying a rotational force onto the second actuator member 114. With this in mind, while the side face 208 is illustrated as being relatively smooth, in other embodiments, features can be incorporated into or formed by the side face 208 that facilitate user interaction. For example, indents, protrusions, texturing, etc., can be formed by or applied to the side face 208 that promote grasping or other tactile interface by a user's hand or fingers.

The hub 202 projects from the leading face 204 of the foot 200 to a leading end 210. The hub 202 can have a cylindrical shape, with an outer diameter of the hub 202 optionally being less than an outer diameter of the foot 200. A threaded surface 212 is formed along an internal surface 214 of the hub 202 adjacent the leading end 210. The threaded surface 212 can be, or can be akin to, a screw thread, forming a helix traversing from a location at or near the leading end 210 and winding toward the foot 200.

The hub 202 forms a passageway 216 extending along the central longitudinal axis $L_{A2}$ and open to the leading end 210. As best seen in FIG. 6B, the passageway 216 further extends through the foot 200 and is open at the trailing face 206. In general terms, the passageway 216 is sized and shaped or otherwise configured to be larger than an outer diameter of the first actuator member post 132 (FIG. 4A), and to receive the first and second output members 112, 116 (FIG. 3). In some embodiments, threads of the threaded surface 212 represent radially inward projections along the internal surface 214; the passageway 216 can have a substantially uniform diameter in longitudinal extension between the threaded surface 212 and at least the foot 200.

The second actuator member 114 can include or provide one or more features or components that promote assembly of the steering control unit 36 (FIG. 3). For example, an internal slot 218 can be formed along the passageway 216.

The internal slot 218 has an annular shape and is configured to capture the clips 156 (FIG. 4A) of the first actuator member 110 (FIG. 4A) as described below. Assembly of the steering control unit 36 (FIG. 3) can be accomplished in a variety of other manners that may or may not entail the clips 156 and/or the internal slot 218; in yet other embodiments, the second actuator member 114 can incorporate one or more additional assembly-related features.

Figure 7A:
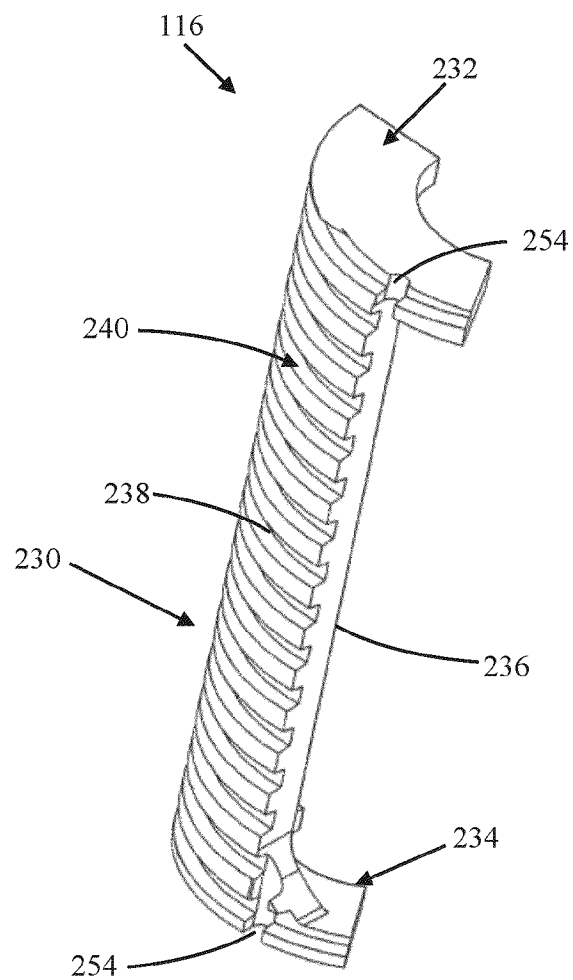
FIG. 7A is a perspective view of a second output member useful with the steering control unit of FIG. 3.
Figure 7B:
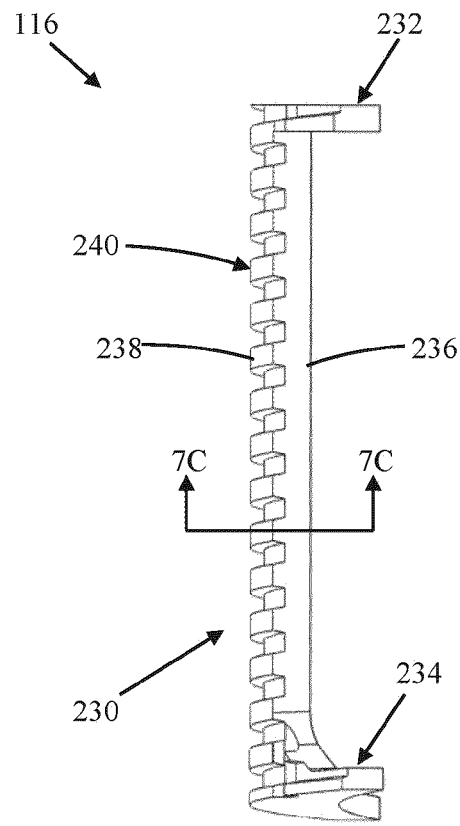
FIG. 7B is a side view of the second output member of FIG. 7A.
Figure 7C:
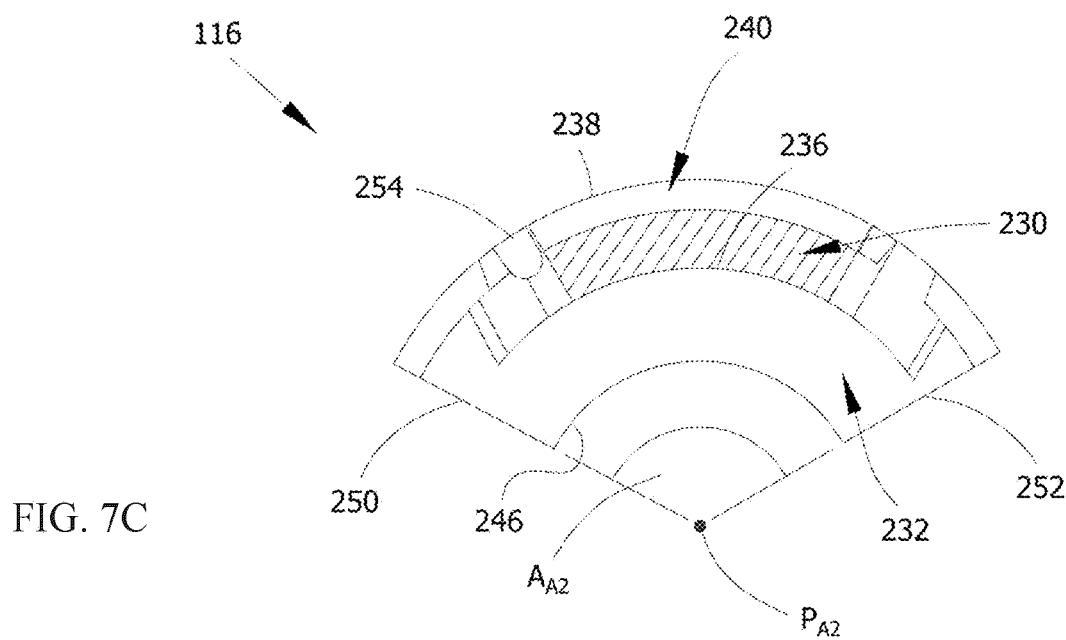
FIG. 7C is a cross-sectional view of the second output member of FIG. 7B, taken along the line 7C-7C.

The second output member 116 is shown in greater detail in FIGS. 7A-7C, and generally includes a partial gear body 230, an upper flange 232 and a lower flange 234. The partial gear body 230 defines an internal face 236 opposite an external face 238. Screw threads 240 are formed or defined in or on the external face 238. A pitch of the screw threads 240 corresponds with that of the threaded surface 212 (FIG. 6A) of the hub 202 (FIG. 6A). As best shown in FIG. 7C, the external face 238 defines a substantially uniform (i.e., within 5% of truly uniform) curve in extension between opposing sides. The curve is an arc of a circle revolving about a center point $P_{A2}$, and is less than one-half of a complete circle. In some embodiments, the internal face 236 of the partial gear body 230 can also define a similar, substantially uniform curve, revolving about the center point $P_{A2}$. Because the curved external face 238, and thus the screw threads 240 formed thereby, is less than a complete circle, the partial gear body 230 serves as a partial or incomplete gear.

The flanges 232, 234 can be similar in shape, each projecting radially outwardly from the partial gear body 230 at opposite ends thereof, terminating at an interior guide face 246 (identified for the upper flange 234 in FIG. 7C). In some embodiments, the interior guide face 246 defines a substantially uniform curve similar to, and concentric with, that of the external face 238, revolving about the center point $P_{A2}$.

One or both of the flanges 232, 234 can extend circumferentially beyond one or both of the sides of the partial gear body 230. Thus, in some embodiments, a circumferential extent or footprint of the second output member 116 is defined by the flanges 232, 234, for example by the opposing side edges 250, 252 of the lower flange 234 as identified in FIG. 7C. In other embodiments, the circumferential extent or footprint of the second output member 116 can be defined by the partial gear body 230. Regardless, a central angle (convex central angle) AA2 defined by the circumferential extent of the second output member 116 (e.g., curved extension between the opposing side edges 250, 252) is less than 180°, alternatively less than 150°, and in some embodiments is in the range of 60°-150°.

One or both of the flanges 232, 234 can optionally form a notch 254 at a location circumferentially beyond the partial gear body 230, for example at an exterior face 256 of the corresponding flange 232, 234. The notch 254 is configured to interface with a corresponding feature of the collar 120 (FIG. 3) as described below. Other interface constructions are also acceptable that may or may not include the notch 254. In yet other embodiments, one or both of the flanges 232, 234 can be omitted.

Figure 8A:
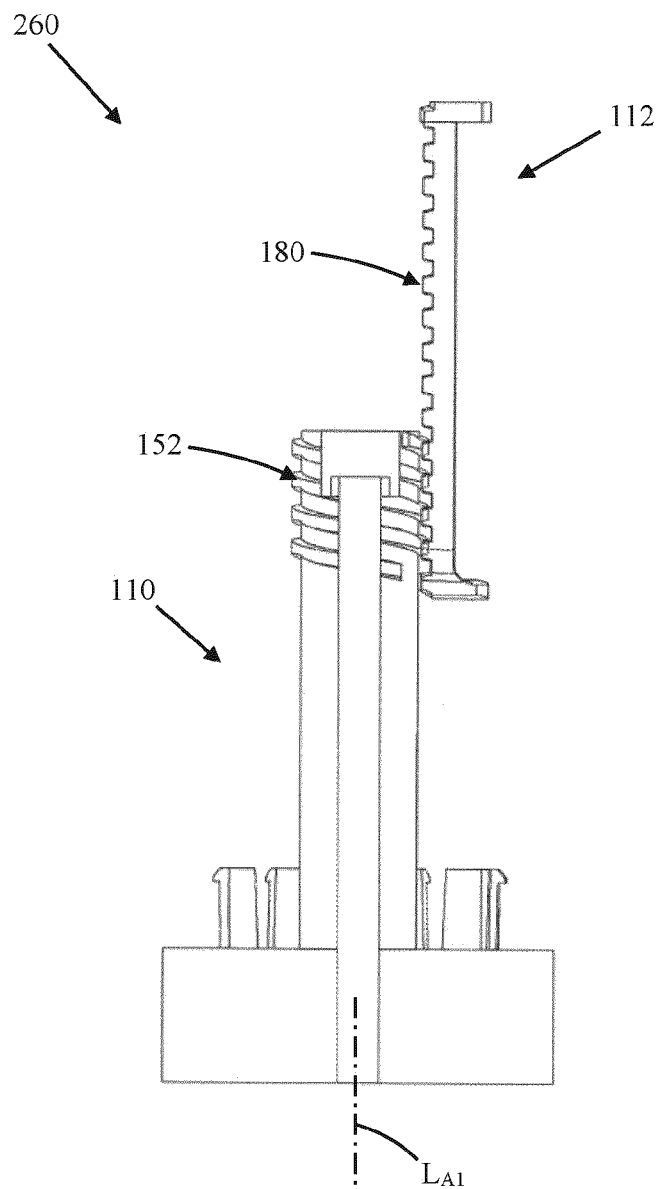
FIG. 8A is a longitudinal cross-sectional view of the first actuator member of FIG. 4A assembled to the first output member of FIG. 5A in defining a first functional assembly useful with the steering control unit of FIG. 3.

Returning to FIG. 3, upon final assembly of the steering control unit 100, the first actuator member 110 and the first output member 112 are threadably connected to one another, and the second actuator member 114 and second output member 116 are threadably connected to one another. For example, FIG. 8A illustrates a relationship of the first actuator member 110 and the first output member 112 in isolation (it being understood that upon final assembly of the steering control unit 100, other components support the first actuator member 110 and the first output member 112 in the arrangement of FIG. 8A). The threaded surface 152 of the first actuator member 110 is threadably engaged with the screw threads 180 of the first output member 112. With this connection, rotation of the first actuator member 110 about the longitudinal axis $L_{A1}$ is transferred to the first output member 112 at the threaded interface, causing the first output member 112 to articulate, for example move in a linear direction substantially parallel (i.e., within 10 degrees of a truly parallel relationship) with the longitudinal axis $L_{A1}$. In some embodiments, the first actuator member 110 and first output member 112 can be viewed as combining to define a first functional assembly 260.

Figure 8B:
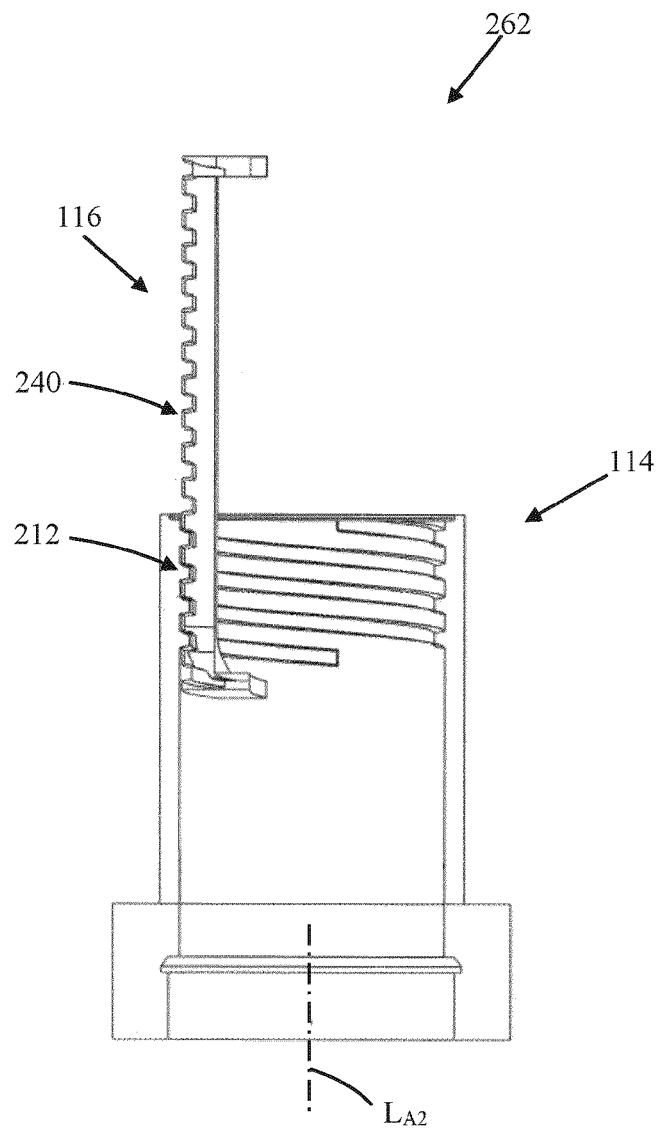
FIG. 8B is a longitudinal cross-sectional view of the second actuator member of FIG. 6A assembled to the second output member of FIG. 7A in defining a second functional assembly useful with the steering control unit of FIG. 3.

FIG. 8B illustrates a relationship of the second actuator member 114 and the second output member 116 in isolation (it being understood that upon final assembly of the steering control unit 100, other components support the second actuator member 114 and the second output member 116 in the arrangement of FIG. 8B). The threaded surface 212 of the second actuator member 114 is threadably engaged with the screw threads 240 of the second output member 116. With this connection, rotation of the second actuator member 114 about the longitudinal axis $L_{A2}$ is transferred to the second output member 116 at the threaded interface, causing the second output member 116 to articulate, for example move in a linear direction substantially parallel (i.e., within 10 degrees of a truly parallel relationship) with the longitudinal axis $L_{A2}$. In some embodiments, the second actuator member 114 and second output member 116 can be viewed as combining to define a second functional assembly 262.

Figure 8C:
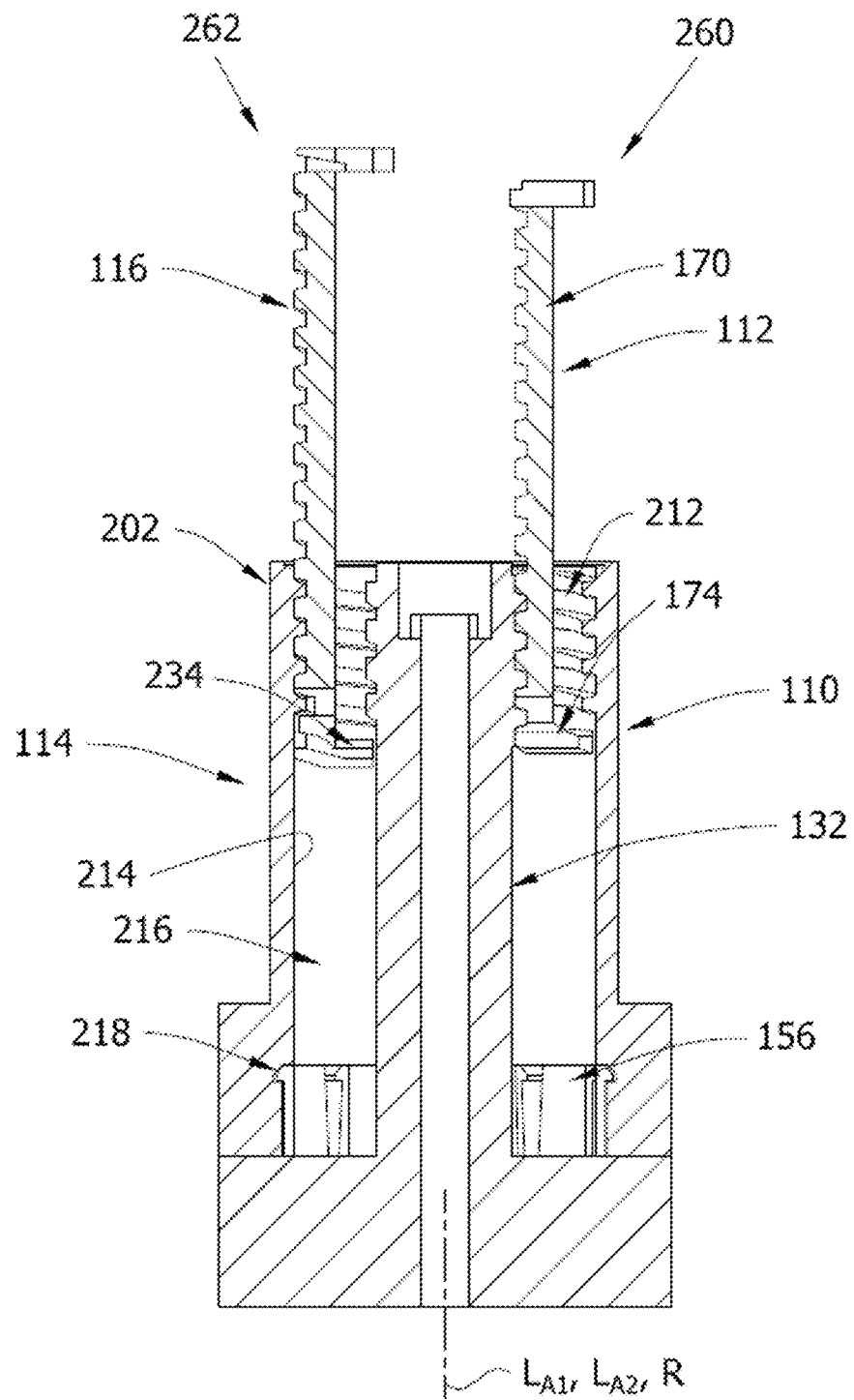
FIG. 8C is a longitudinal cross-sectional view illustrating assembly of the first functional assembly of FIG. 8A and the second functional assembly of FIG. 8B.

FIG. 8C illustrates a relationship of the first actuator member 110/first output member 112 (or first functional assembly 260) and the second actuator member 114/second output member 116 (or second functional assembly 262) upon final assembly in isolation (it being understood that upon final assembly of the steering control unit 100, other components support the arrangement of FIG. 8C). The first actuator member 110 is arranged relative to the second actuator member 114 such that the post 132 extends into the passageway 216 of the hub 202. Further, the longitudinal axis $L_{A1}$ of the first actuator member 110 is aligned with the longitudinal axis $L_{A2}$ of the second actuator member 114. The first and second actuator members 110, 114 are thus rotatable about a common axis of rotation R. In some non-limiting examples, the clips 156 of the first actuator member 110 are captured within the internal slot 218 of the second actuator member 114. With this construction, the first actuator member 110 can freely rotate relative to the second actuator member 114 about the axis of rotation R (and vice-versa), but the first and second actuator members 110, 114 are prevented from moving longitudinally relative to one another (e.g., the first actuator member 110 cannot move linearly along the axis of rotation R relative to the second actuator member 114). A variety of other configurations establishing this connection (e.g., permitting independent rotation but impeding independent longitudinal movement) between the first and second actuator members 110, 114 are also acceptable.

FIG. 8C further reflects that upon final assembly, a portion of the first output member 112 (that again is threadably engaged with the first actuator member 110) is located within the passageway 216 of the hub 202. A size, shape, and location of the first output member 112 is such that the first output member 110 does not interfere with threaded engagement between the second actuator member 114 and the second output member 116, and does not interfere with rotation of the second actuator member 114. For example, in the view of FIG. 8C, the lower flange 174 of the first output member 112 can rest or bear against the internal surface 214 of the hub 202 at a location spaced from the threaded surface 212. A curvature of the lower flange 174 corresponds with that of the internal surface 214 such that the hub 202, and thus the second actuator member 114 can freely rotate relative to the lower flange 174. Further, a spatial position of the partial gear body 170 of the first output member 112 relative to the lower flange 174 spaces the partial gear body 170 away from the internal surface 214. With this relationship, then, the hub 202, and thus the second actuator member 114, can freely rotate relative to the first output member 112 about the axis of rotation R, and the first output member 112 can freely linearly translate or move (e.g., parallel to the axis of rotation R) relative to the second actuator member 114. Conversely, the lower flange 234 of the second output member 116 can be sized and shaped to be radially constrained between the post 132 and the hub 202 in a manner that allows the post 132, and thus the first actuator member 110, to freely rotate relative to the second output member 116 about the axis of rotation R, and the second output member 116 can freely linearly translate or move (e.g., parallel to the axis of rotation R) relative to the first actuator member 110. With these and related configurations, the first actuator member 110 and the first output member 112 combine to define a first functional assembly, and the second actuator member 114 and the second output member 116 combine to define a second functional assembly.

Figure 9A:
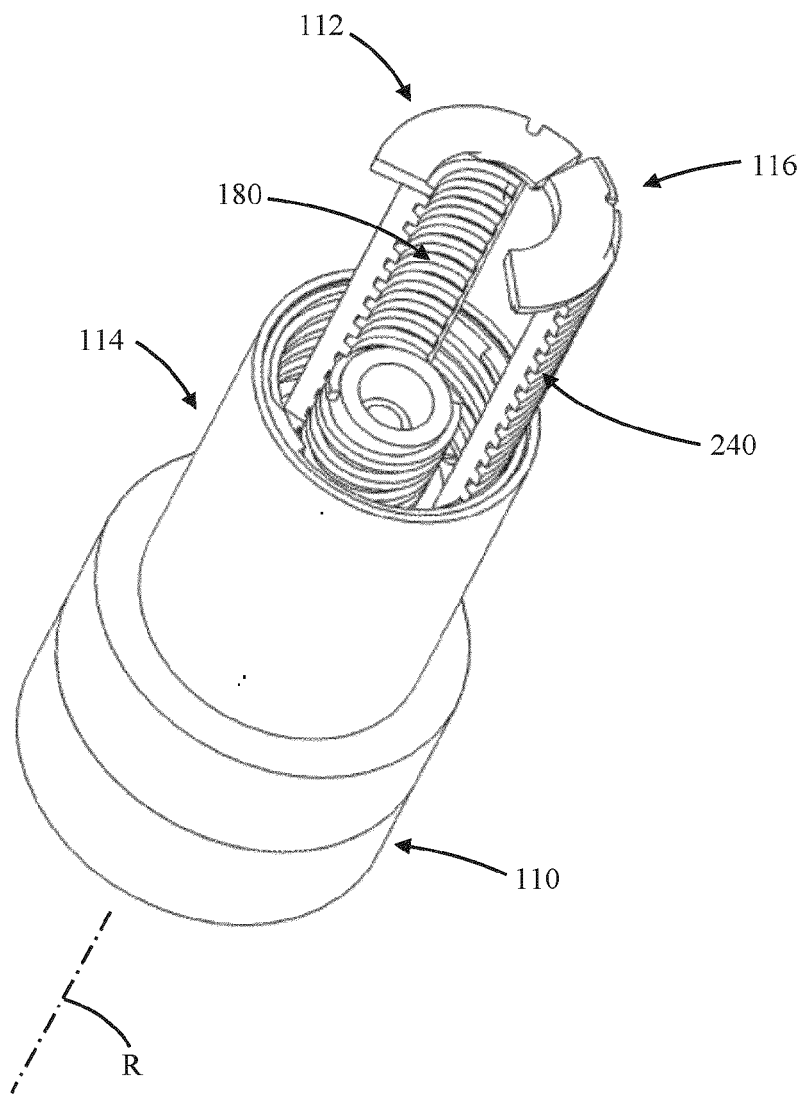
FIG. 9A is a perspective view of the assembly of FIG. 8C.
Figure 9B:
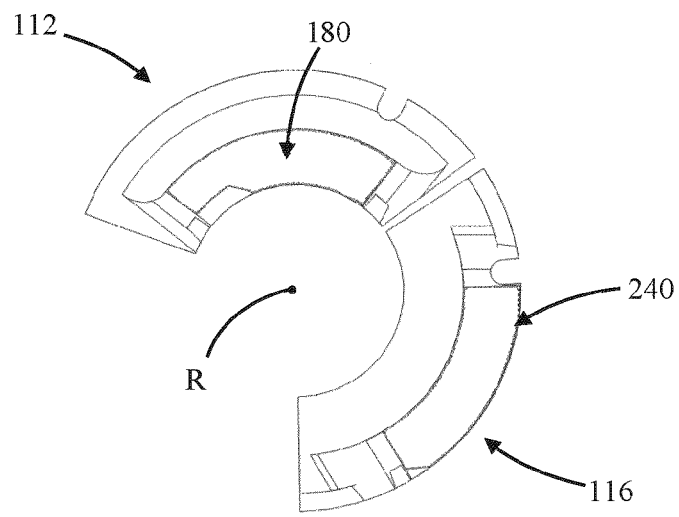
FIG. 9B is a transverse cross-sectional view of the first and second output members of the arrangement of FIG. 9A in isolation.
Figure 9C:
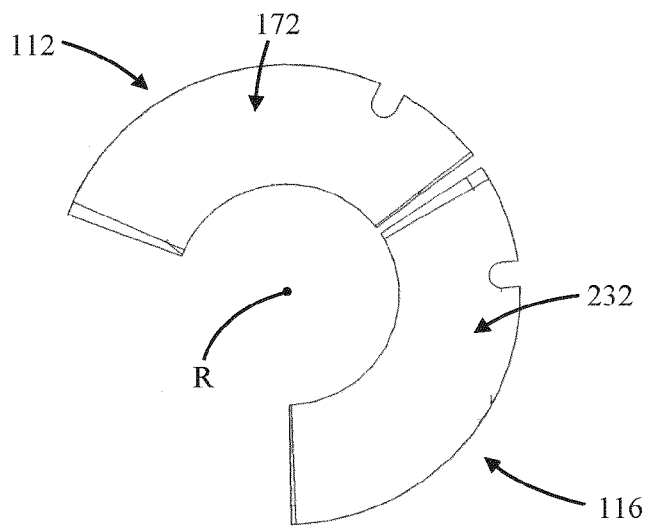
FIG. 9C is an end view of the first and second output members of the arrangement of FIG. 9A in isolation.

FIG. 9A provides a perspective view of the arrangement of FIG. 8C (i.e., a relationship of the first actuator member 110/first output member 112 and the second actuator member 114/second output member 116 upon final assembly in isolation). With some embodiments of the present disclosure, the first and second output members 112, 116 are circumferentially separated from one another, yet concentrically arranged about the axis of rotation R. For example, and with additional reference to the cross-sectional view of FIG. 9B (that otherwise depicts the first and second output member 112, 116 from the arrangement of FIG. 9A in isolation), while a radius of the screw threads 180 of the first output member 112 differs from that of the screw threads 240 of the second output member 116, a curvature of the screw threads 180 revolves about the axis of rotation R, as does a curvature of the screw threads 240. The plan view of FIG. 9C (that again depicts the first and second output member 112, 116 from the arrangement of FIG. 9A in isolation) reflects that a similar, concentric arrangement can optionally established at the flanges of the output members 112, 116 (e.g., in FIG. 9C, the upper flange 172 of the first output member 112 and the upper flange 232 of the second output member 116 are concentric relative to the axis of rotation R). Regardless, the upper flanges 172, 232 are physically separated from one another, and provide sufficient surface area for attachment of the corresponding steering wire 32, 34 (FIG. 2) at a desired circumferential location. For example, an arrangement and configuration of the upper flanges 172, 232 allows for the first steering wire 32 to be attached to the upper flange 172 of the first output member 112 at a location that is approximately 90 degrees from a point of attachment of the second steering wire 34 to the upper flange 232 of the second output member 116. Other configurations are also acceptable.

Returning to FIG. 3, the steering control unit 100 can include one or more components that retain the first actuator member 110/first output member 112 and the second actuator member 114/second output member 116 relative to one another. For example, the collar 120 can be configured to support the output members 112, 116 relative to one another and dictate linear or longitudinal movement with rotation of the corresponding actuator member 110, 114. With this in mind, one embodiment of the collar 120 is shown in greater detail in FIGS. 10A and 10B. The collar 120 includes or defines an annular shell 280, first and second posts 282, 284, and first, second and third ribs 286, 288, 290. The shell 280 is a ring-like body, defining a central passage 292. Inner and outer diameters of the shell 280 can, in some embodiments, corresponding with the inner and outer diameters of the hub 202 (FIG. 6A). The first and second posts 282, 284 are formed as radially-inward projections from an inner surface of the shell 280, and extend linearly or longitudinally. The posts 282, 284 are each sized and shaped to be slidably received by a corresponding component of the first and second output members 112, 116 (FIG. 3), respectively, as made clear below. In this regard, the first and second posts 282, 284 are located relative to one another relative to a circumference of the shell 280 in accordance with desired locations of the first and second output members 112, 116 upon final assembly. The first-third ribs 286-290 are also formed as radially-inward projections from an inner surface of the shell, and each extend linearly or longitudinally. As clarified below, the first-third ribs 286-290 are configured and arranged relative to a circumference of the shell 280 so as to further dictate a circumferential location of the first and second output member 112, 116 relative to one another.

The collar 120 can include or provide one or more additional features that promote assembly with other components of the steering control unit 100 (FIG. 3). For example, in some non-limiting embodiments, one or more longitudinal grooves can be formed in an outer surface of the shell 280, such as the two grooves identified at 294, generally configured to interface with corresponding features of the outer housing 124 as made clear below. Further, one or more dimples can be formed in an upper edge 296 of the shell 280, such as the two dimples identified at 298, generally configured to interface with corresponding features of the cover 122 (FIG. 3) as made clear below.

Figure 11A:
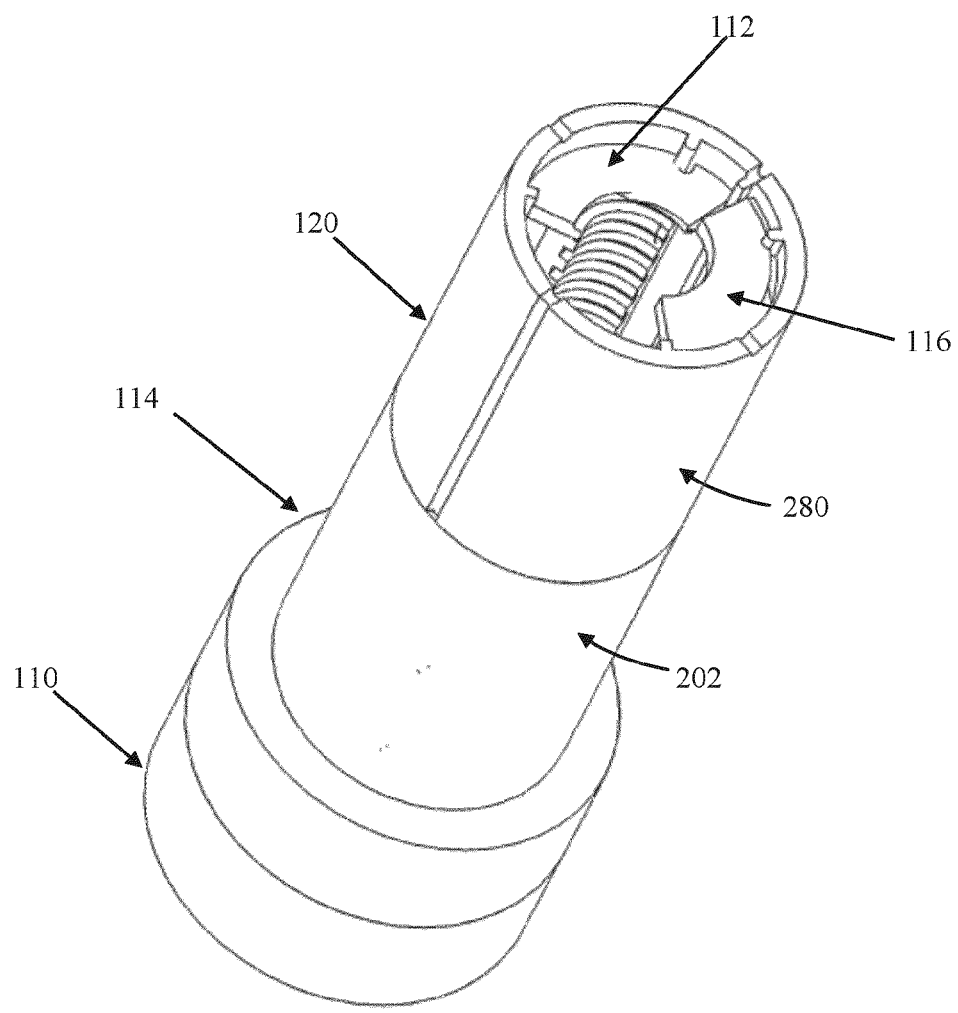
FIG. 11A is a perspective view of the collar of FIG. 10A assembled to the arrangement of FIG. 9A.
Figure 11B:
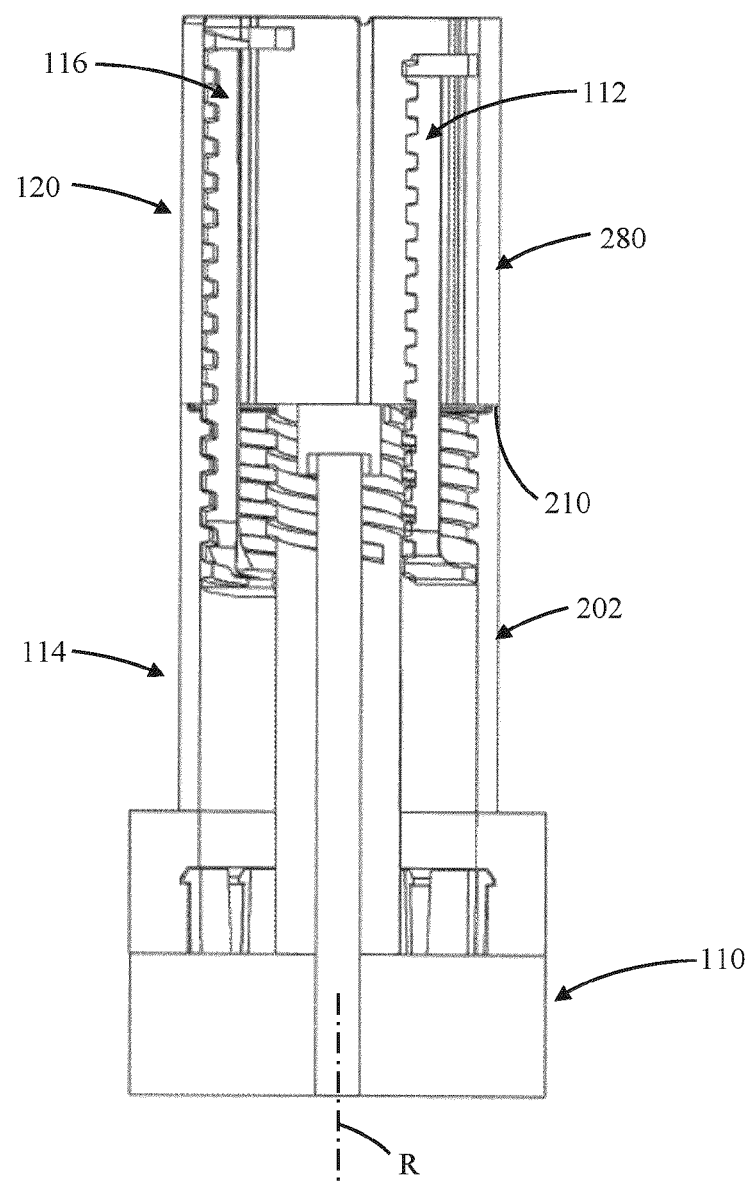
FIG. 11B is a longitudinal cross-sectional view of the arrangement of FIG. 11A.

FIGS. 11A and 11B illustrate, in isolation, assembly of the collar 120 to the first actuator member 110/first output member 112 and the second actuator member 114/second output member 116 (it being understood that upon final assembly of the steering control unit 100 (FIG. 3), other components support the arrangement of FIGS. 11A and 11B). The shell 280 is aligned with the hub 202, and in some embodiments abuts the leading end 210. The shell 280 surrounds the first and second output members 112, 116, with the collar 120 further retaining the first and second output members 112, 116 in a manner that constrains movement thereof relative to the axis of rotation R. In particular, the first post 282 nests within the notch 188 of the upper flange 172 of the first output member 112; this interface prevents rotation the while permitting longitudinal movement of the first output member 112 in response to rotation of the first actuator member 110. Similarly, the second post 284 nests within the notch 254 of the upper flange 232 of the second output member 116; this interface prevents rotation the while permitting longitudinal movement of the second output member 116 in response to rotation of the second actuator member 114. A further constraint against rotation of the first output member 112 is provided by the first and second ribs 286, 288 (that otherwise circumferentially capture the upper flange 172); similarly, a further constraint against rotation of the second output member 116 is provided by the second and third ribs 288, 290 (that otherwise circumferentially capture the upper flange 232). Alternatively, other components and/or mechanisms can be employed to constrain movement of the output members 112, 116 that may or may not include the collar 120 can be employed.

Figure 10A:
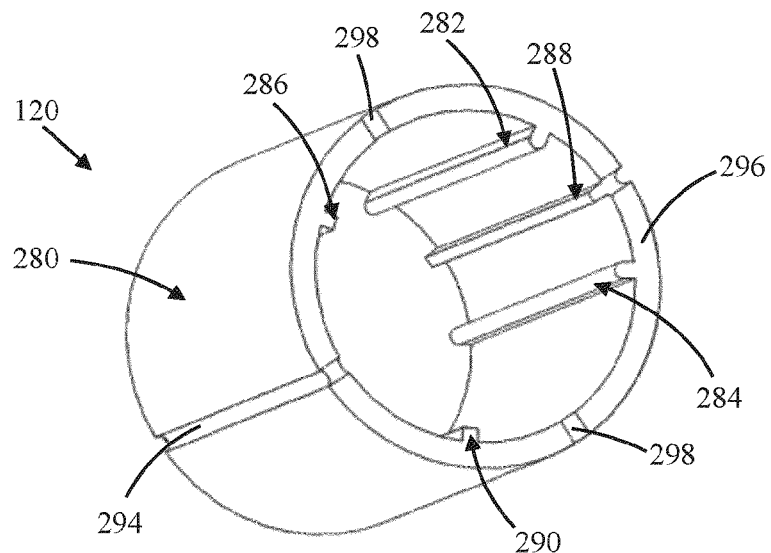
FIG. 10A is a perspective view of a collar useful with the steering control unit of FIG. 3.
Figure 10B:
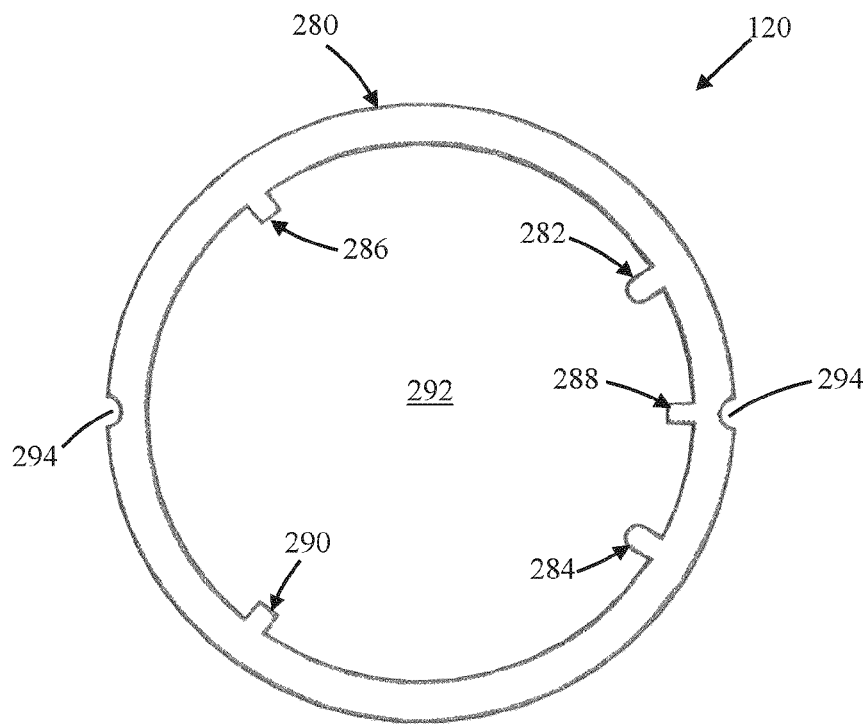
FIG. 10B is an end view of the collar of FIG. 10A.
Figure 12A:
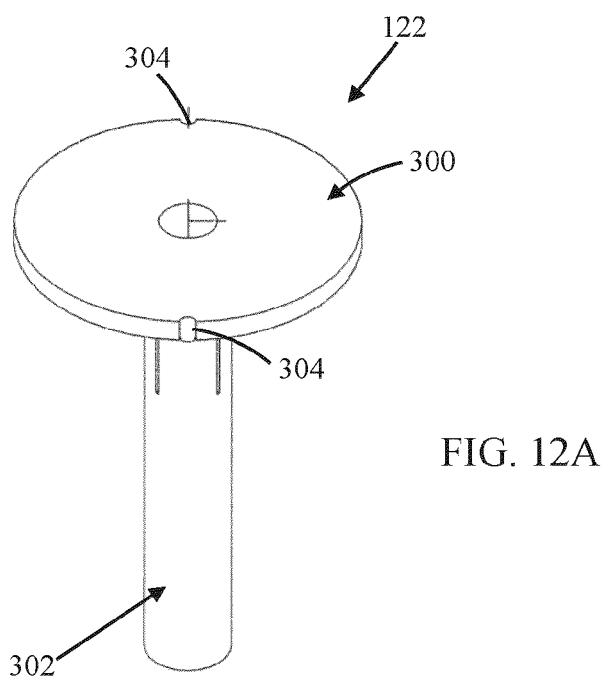
FIG. 12A is a perspective view of a cover useful with the steering control unit of FIG. 3.
Figure 12B:
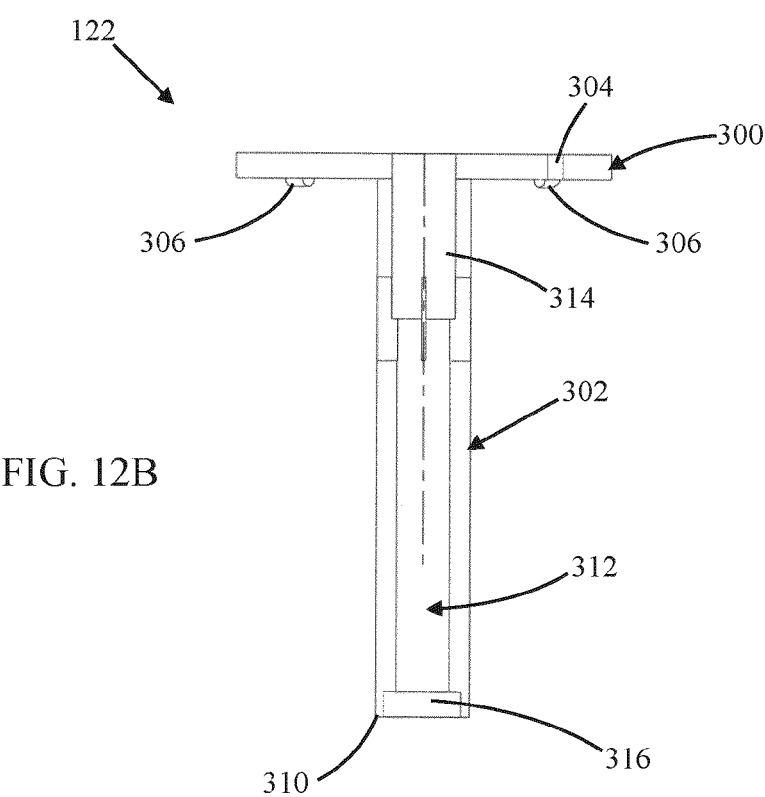
FIG. 12B is a longitudinal cross-sectional view of the cover of FIG. 12A.

Returning to FIG. 3, the cover 122 is generally configured to provide a limit to longitudinal movement of the output member 112, 116, as well as link for rotational locking of the collar 120. One embodiment of the cover 122 is shown in greater detail in FIGS. 12A and 12B, and includes or defines a head 300 and a neck 302. The head 300 can be a disc-like body, having an outer diameter corresponding with an inner diameter of the annular shell 280 (FIG. 10A) of the collar 120 (FIG. 10A). In some embodiments, one or more longitudinal grooves 304 are formed or defined along an outer circumference of the head 300, and/or one or more tabs 306 projecting longitudinally from an inner face of the head 300 for reasons made clear below.

The neck 302 extends longitudinally from the head 300 and terminates at a trailing end 310. The neck 302 is a cylindrical tube, defining a central bore 312 that is open at the trailing end 310. The central bore 312 continues through, and is open at, the head 300. A leading region 314 of the central bore 312 can be sized and shaped or otherwise configured to receive a proximal portion of the catheter 30 (FIG. 3).

Figure 13A:
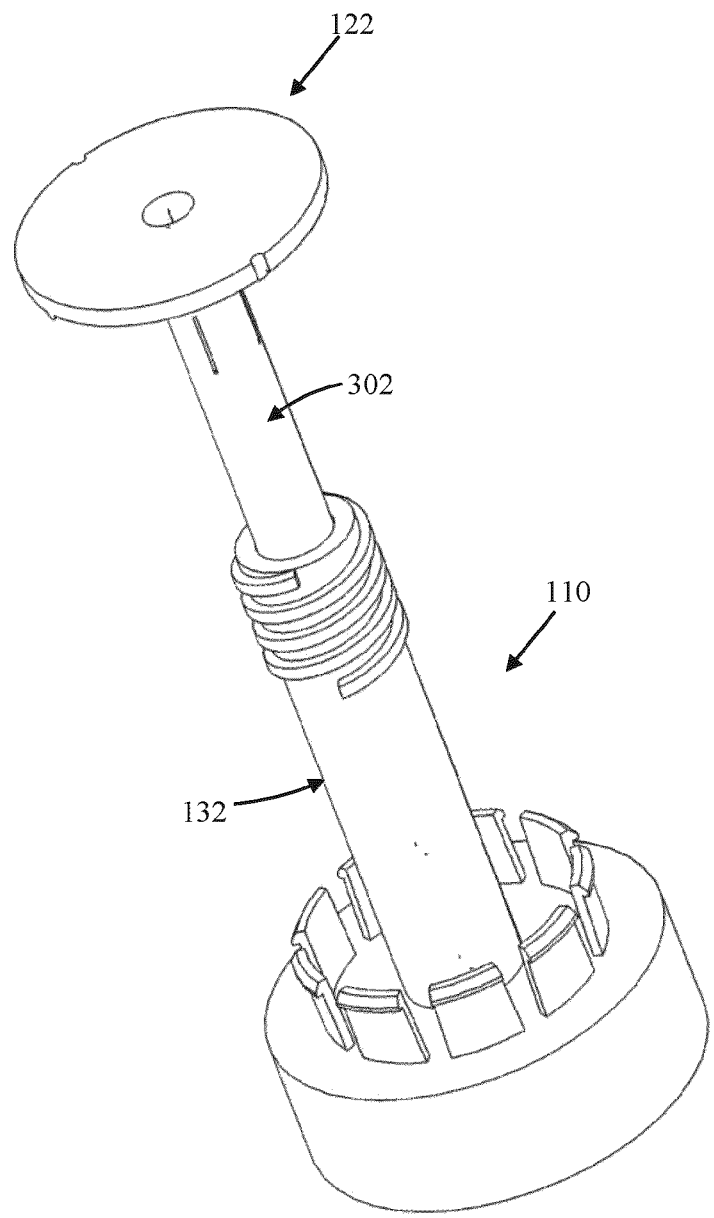
FIG. 13A is a perspective view of the cover of FIG. 12A assembled to the first actuator member of FIG. 4A.
Figure 13B:
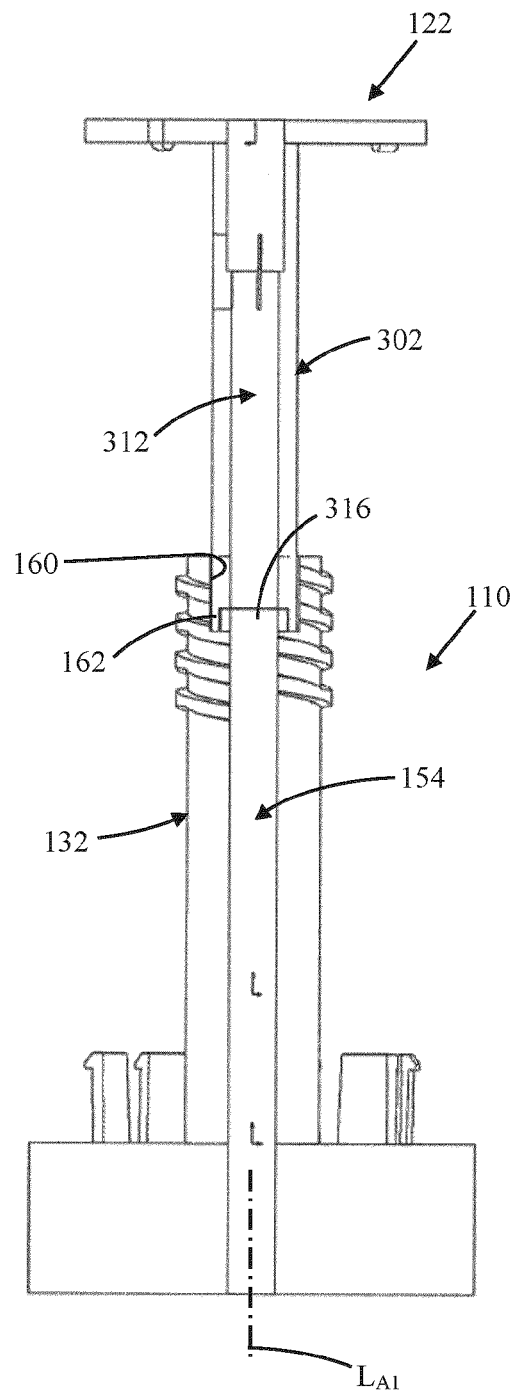
FIG. 13B is a longitudinal cross-sectional view of the arrangement of FIG. 13A.

A trailing region 316 of the central bore 312 can be sized and shaped or otherwise configured for mounting to the first actuator member 110 (FIG. 3) as described in greater detail below. For example, FIGS. 13A and 13B illustrate, in isolation, assembly of the cover 122 to the first actuator member 110. The neck 302 is inserted into the pocket 160 of the post 132, with the trailing region 316 of the central bore 312 nesting over the rim 162. The central bore 312 is longitudinally aligned with the lumen 154 of the post 132, and thus upon final assembly shares the central longitudinal axis LAL With this construction, the cover 120 is longitudinally and transversely supported relative to the first actuator member 110 in manner that allows the post 132, and thus the first actuator member 110, to freely rotate relative to the cover 120 about the central longitudinal axis LAL Other assembly techniques are also acceptable.

Returning to FIG. 3, the outer housing 124 can assume various forms that facilitate final assembly of the steering control unit 100. The outer housing 124 can be a tubular body formed by two (or more) segments; in other embodiments, the outer housing 124 can be a single, homogenous structure. Regardless, the outer housing 124 defines a central passage 320 sized to receive components of steering control unit 100, including the collar 120 and the hub 202, as described below. In some embodiments, an outer diameter of the outer housing 124 is less than an outer diameter of the second actuator member foot 200. In some embodiments, the outer housing 124 can form or carry one or more features that promote an interface with other components of the steering control unit 100. For example, the outer housing 124 can optionally form one or more longitudinal ridges 322 (one of which is labeled in FIG. 3), formed as inward projections along the central passage 320 for reasons made clear below. Additionally, the outer housing 124 can optionally form a lip 324 at a leading end 326 thereof.

Figure 14A:
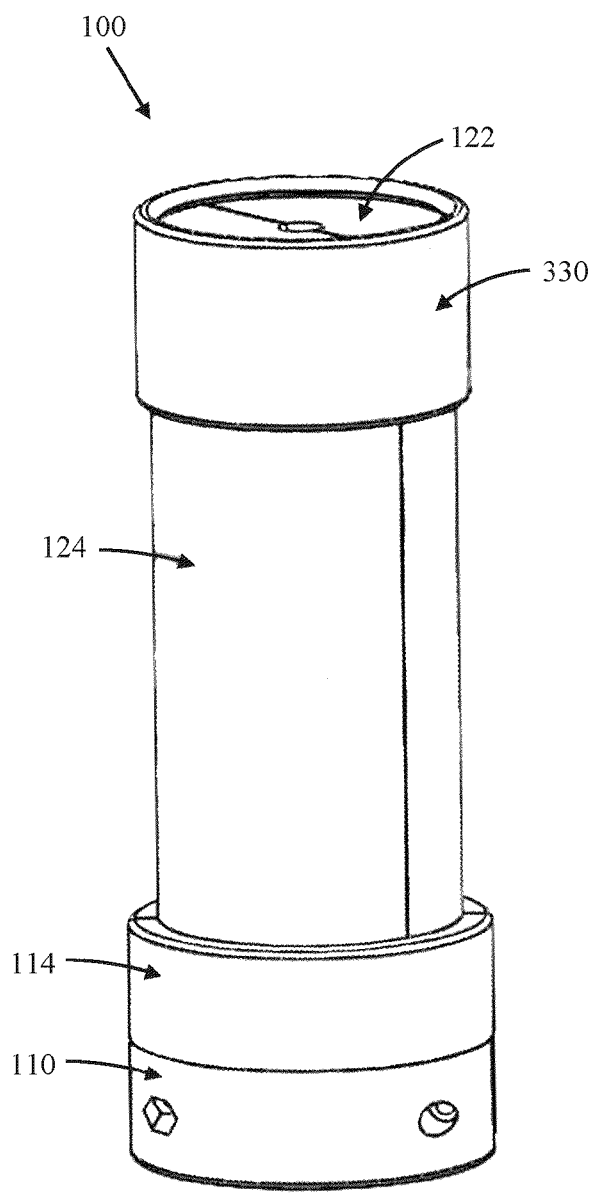
FIG. 14A is a perspective view of the steering control unit of FIG. 3 upon final assembly.
Figure 14B:
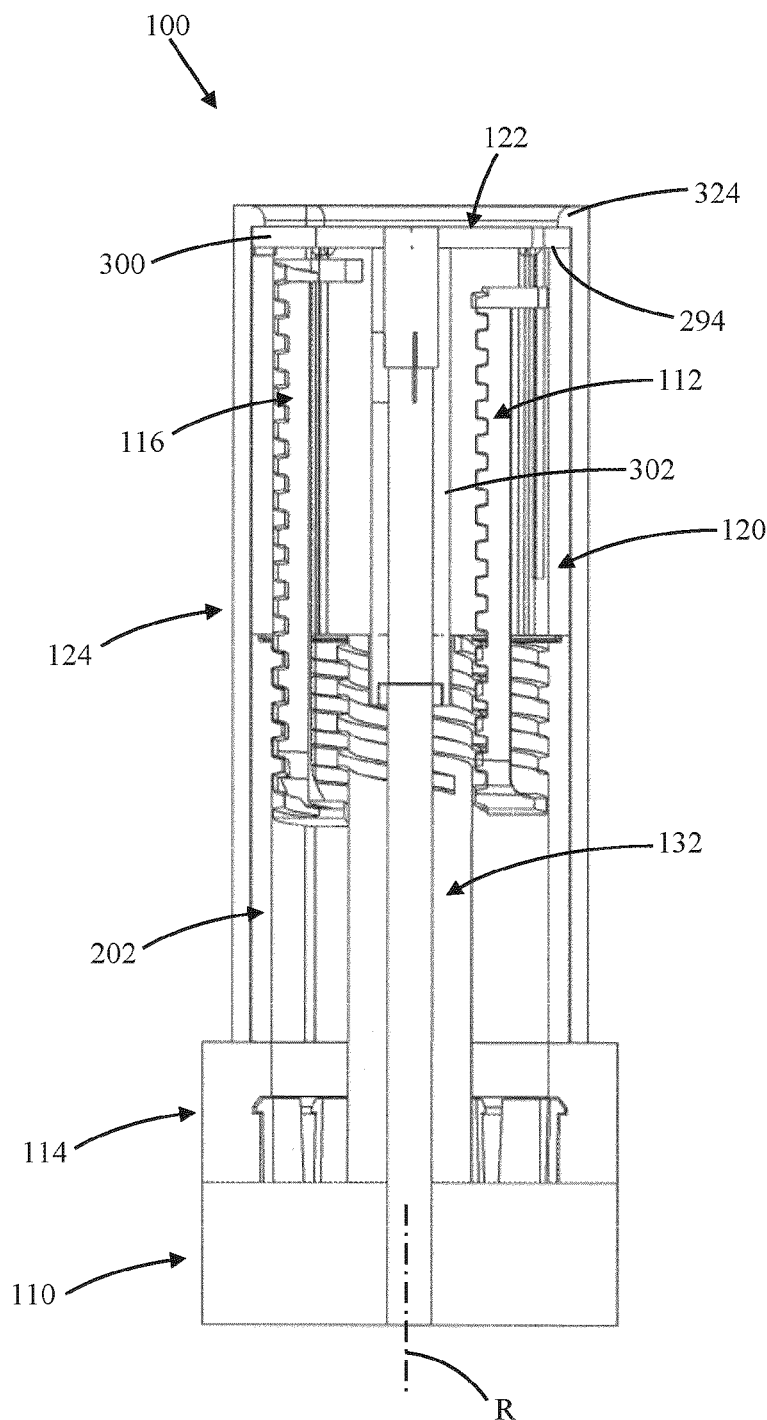
FIG. 14B is a longitudinal cross-sectional view of the steering control unit of FIG. 14A.

FIGS. 14A and 14B illustrate the steering control unit 100 upon final assembly. As a point of reference, an optional cap 330 component of the steering control unit 100 is shown in FIG. 14A, assembled to the outer housing 124. For ease of understanding, the cap 330 is omitted from the view of FIG. 14B. As shown, the first actuator member 110/first output member 112 and the second actuator member 114/second output member 116 are assembled relative to one another commensurate with the descriptions above. Similarly, the collar 120 is assembled over the first and second output members 112, 116, and the cover 122 is connected to the post 132 as described above. The outer housing 124 is assembled over the hub 202, the collar 120, and the cover 122. Thus, in the arrangement of FIG. 14B, the first and second output members 112, 116, along with the cover 122, the collar 120, the hub 202, and a portion of the post 132 are all disposed within the central passage 320 (FIG. 3) of the outer housing 124. The head 300 of the cover 122 is retained between the lip 324 of the outer housing 124 and the upper edge 294 of the collar 120. Alternatively or in addition, the optional cap 330 can be provided that longitudinally secures the cover 122 relative to the outer housing 124. Further, the outer housing 124 effects a rotational lock between the collar 120 and the cover 122. In particular, the longitudinal ridge(s) 322 (FIG. 3) of the outer housing is received within the corresponding groove 294 (FIG. 10A) of the collar 120 and the groove 304 (FIG. 12A) of the cover head 300, thus impeding rotation of the collar 120 and the cover 122 relative to the outer housing 124 (and relative to each other). A further rotational lock between the collar 120 and the cover 122 can be provided by the tab(s) 306 (FIG. 12A) of the cover 122 nesting in a corresponding one of the dimples 298 (FIG. 10A) of the collar 120. A wide variety of other assembly techniques and/or components can be utilized to achieve these spatial relationships.

Upon final assembly, the first and second actuator members 110, 114 can each freely rotate about the axis of rotation R relative to each other and relative to the outer housing 124, the collar 120 and the cover 122, but are prevented from moving longitudinally relative to each other and relative to the outer housing 124, the collar 120 and the cover 122. Conversely, first and second output members 112, 116 are impeded or prevented from rotating relative to the collar 120 (and thus relative to the cover 122 and the outer housing 124), but can move or translate linearly or longitudinally (e.g., parallel to the axis of rotation R). The concentrically arranged actuator members 110, 114 and output members 112, 116 facilitates multi-planar steering as described below in a relatively small or compact device. In some non-limiting embodiments, the steering control unit 100 can have a longitudinal length of less the 200 millimeters (mm), optionally on the order of 150-200 mm. With these and related constructions, the steering control unit 100 is well suited for use as a component of an introducer as the reduced size or length presents minimal impediments to the working length of a separate treatment device inserted, or introduced, through the steering control unit 100.

Figure 15:
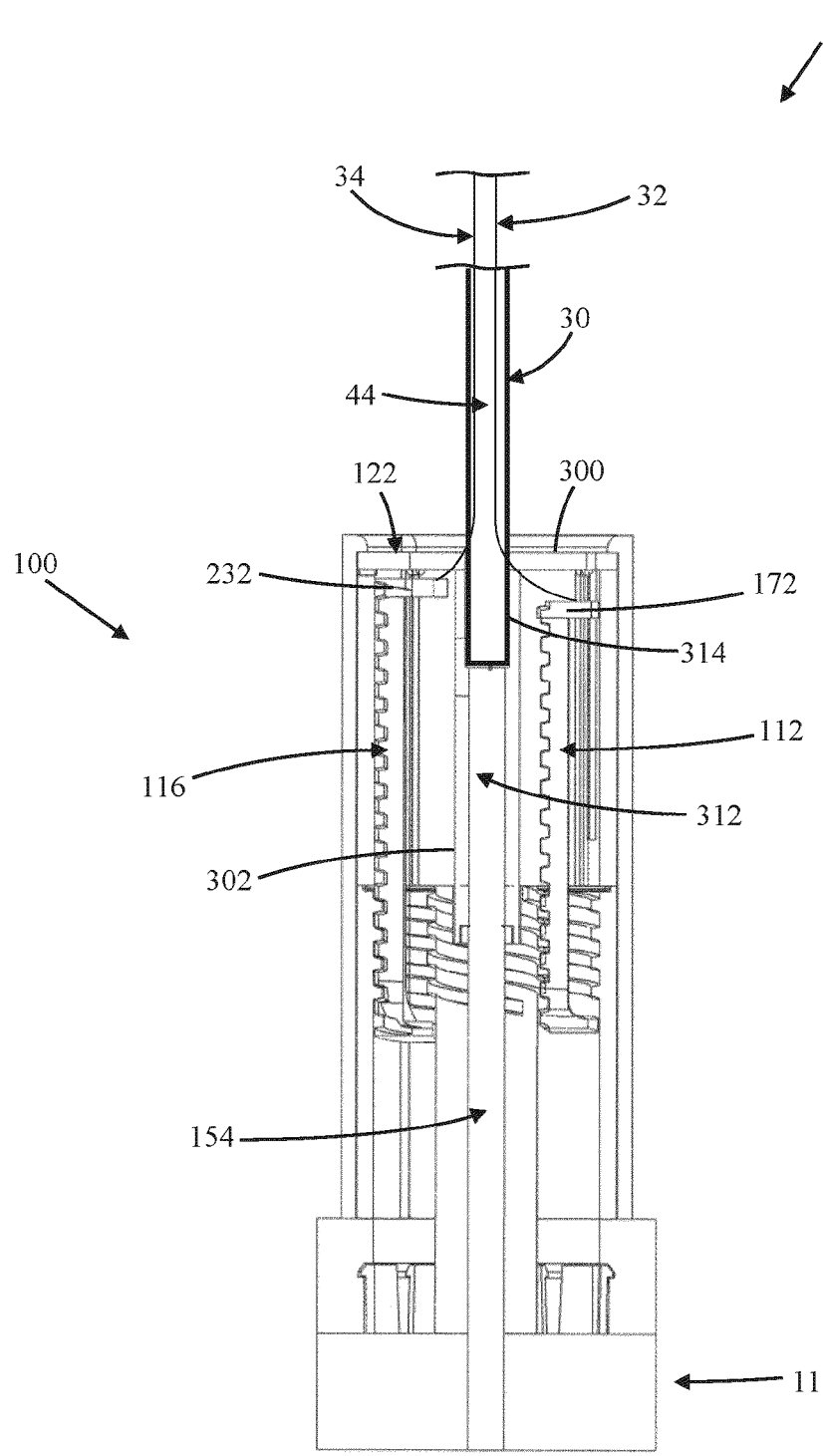
FIG. 15 is a longitudinal cross-sectional view of a steerable catheter device in accordance with principles of the present disclosure, including the steering control unit of FIG. 3 assembled to a catheter and steering wires.

One example of assembly of the catheter 30 and the steering wires 32, 34 to the steering control unit 100 is shown in FIG. 15. The catheter 30 can be inserted into the central bore 312 of the cover 122, and secured within the leading region 314 (e.g., friction fit, adhesive, bonding, etc.). The first steering wire 32 is attached to the first output member 112 and the second steering wire 34 is attached to the second output member 116. Routing of the steering wires 32, 34 from the catheter 30 to the corresponding output member 112, 116 can be achieved in various fashions. For example, the steering wires 32, 34 can each extend from or exit the catheter 30 outside the cover 122 and pass through a corresponding hole (not shown) in the head 300; in other embodiment, the steering wires 32, 34 can extend from or exit the catheter 30 inside the cover and pass through a corresponding hole (not shown) in the neck 302. While FIG. 15 generally reflects the first steering wire 32 attached to the upper flange 172 of the first output member 112 and the second steering wire 34 attached to the upper flange 232 of the second output member 116, other arrangements are acceptable. The first steering wire 32 can be attached anywhere along the first output member 112 and the second steering wire 34 can be attached anywhere along the second output member 116. Regardless, upon final assembly, the central lumen 44 (referenced generally) of the catheter 30 is open to and aligned with the central bore 312 of the cover 122 that in turn is open to and aligned with the lumen 154 of the first actuator member 110. With this construction, the steering catheter device 20 can serve, for example, as an introducer. In some non-limiting examples, methods of the present disclosure can include a clinician advancing the catheter 30 into a patient's vasculature, followed by inserting a separate treatment device (e.g., a transcatheter prosthetic heart valve delivery device) into the steering control unit 100 (at the lumen 154) and advancing the treatment device into and then through the central lumen 44 of the catheter 30.

Figure 16A:
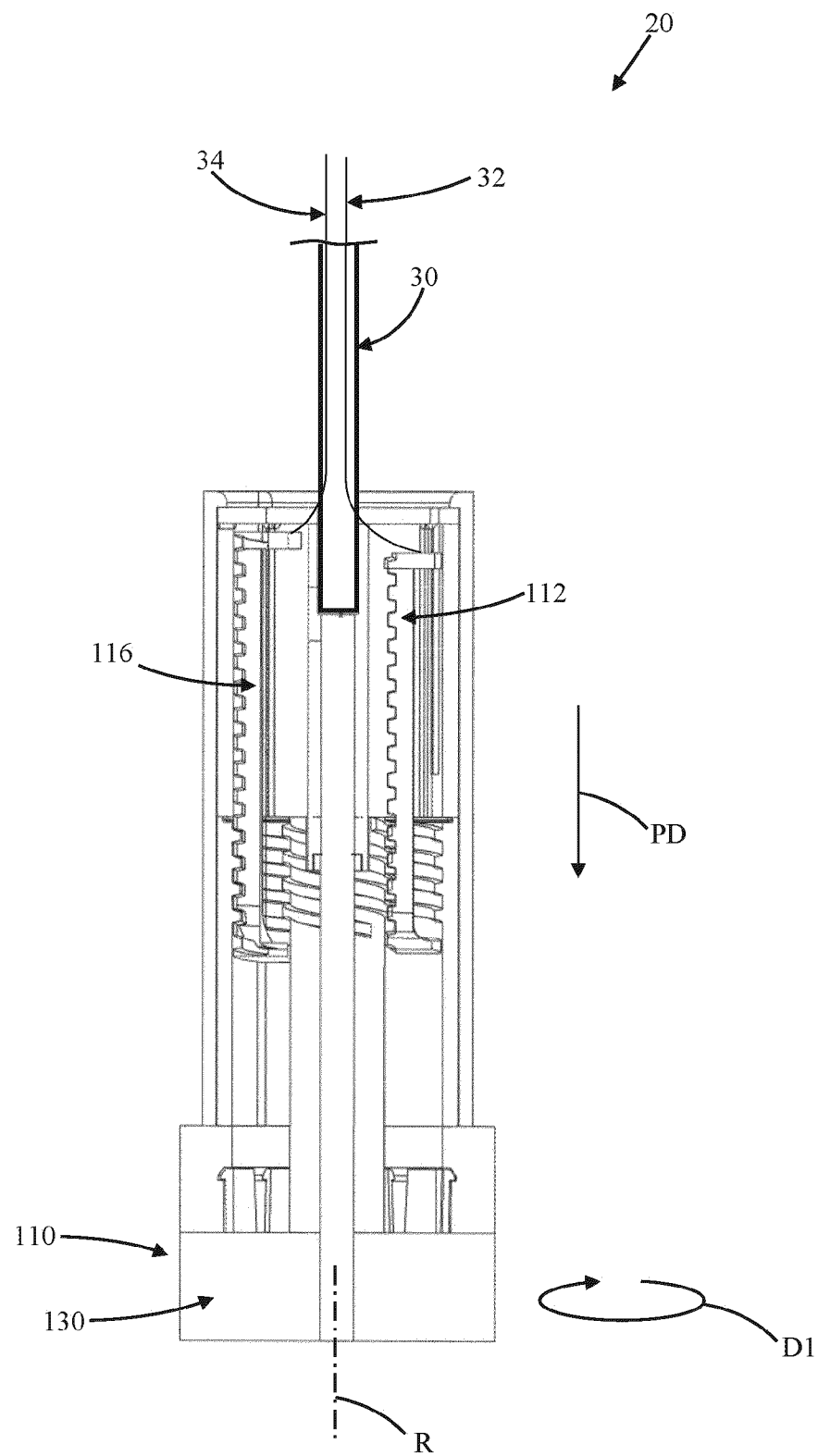
FIGS. 16A-17B illustrate operation of the steerable catheter device of FIG. 15.
Figure 16B:
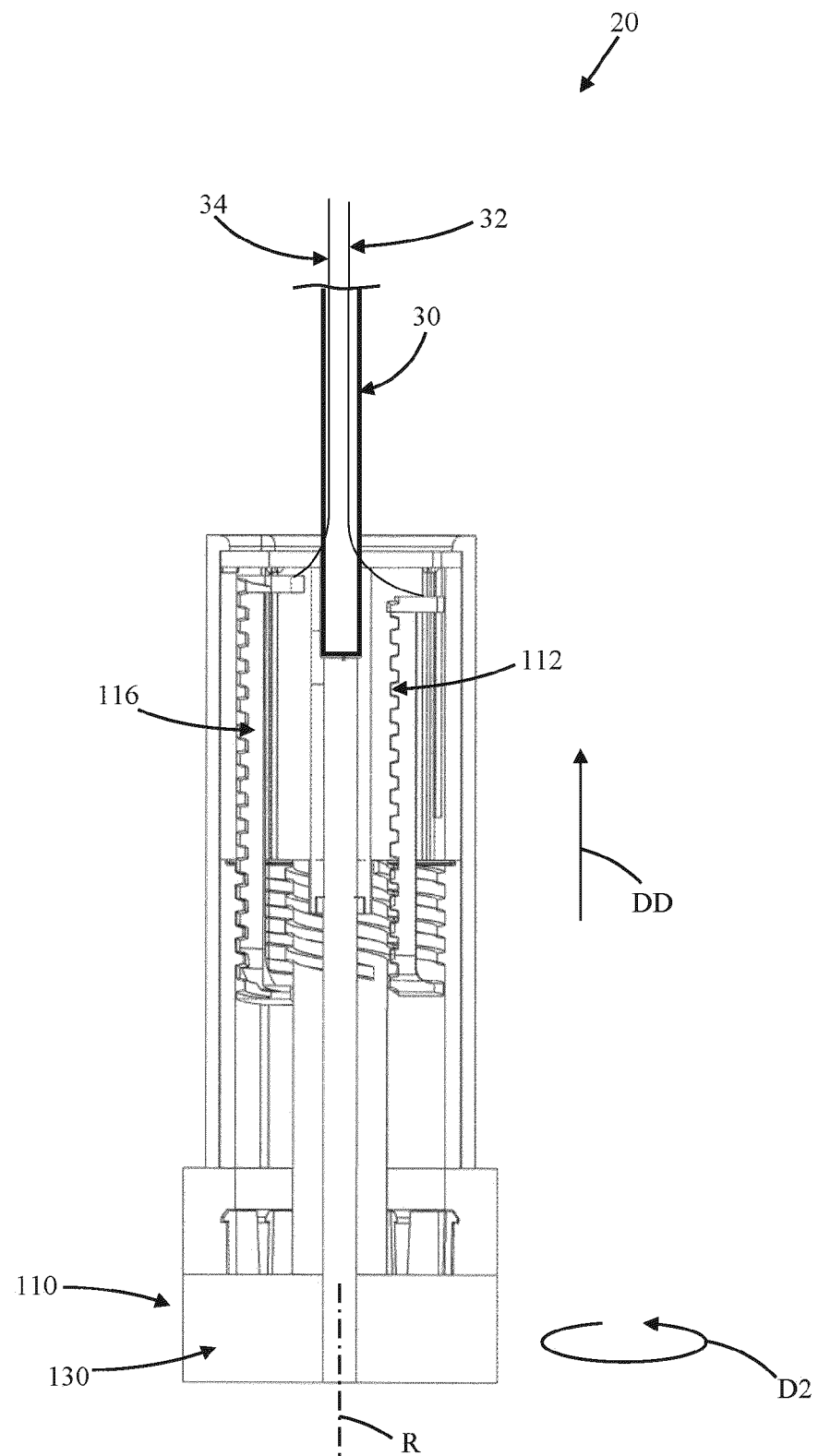

The steering control unit 100 is operable by a clinician or other user to steer or articulate the catheter 30, for example the distal region 42 (FIG. 1), in at least two planes. With reference to FIG. 16A, the clinician can rotate the first actuator member 110 (e.g., by grasping and turning the base 130) about the axis of rotation R in a first rotational direction D1. Commensurate with the descriptions above, the first output member 112 is caused to move or translate linearly (e.g., parallel to the axis of rotation R) in a proximal direction (arrow PD) in response to rotation of the first actuator member 110 in the first rotational direction D1. Movement of the first output member 112 in the proximal direction PD applies a tension force onto the first steering wire 32. Tension in the first steering wire 32 is transferred to the catheter 30 at the point of attachment with the distal end of the first steering wire 32, for example at the distal region 42, as a pulling force. With additional reference to FIG. 2, the pulling force exerting by the first steering wire 32 causes the corresponding region of the catheter to move or articulate in the positive X direction. Conversely, and with reference to FIG. 16B, the clinician can rotate the first actuator member 110 about the axis of rotation R in an opposite, second rotational direction D2, causing the first output member 112 to move or translate linearly in a distal direction (arrow DD). Movement of the first output member 112 in the distal direction DD decreases or lessens tension in the first steering wire 32, thus decreasing or lessening the pulling force being applied by the first steering wire 32 onto the catheter 30 at the point of attachment. With additional reference to FIG. 2, decreasing the pulling force exerting by the first steering wire 32 causes or allows the corresponding region of the catheter to move or articulate in the negative X direction. The second output member 116 does not move with the above-described movements of the first output member 112 and thus a tension (if any) applied to the second steering wire 34 (as well as a pulling force, if any, being applied to the catheter 30 by the second steering wire 34) does not change.

Figure 17A:
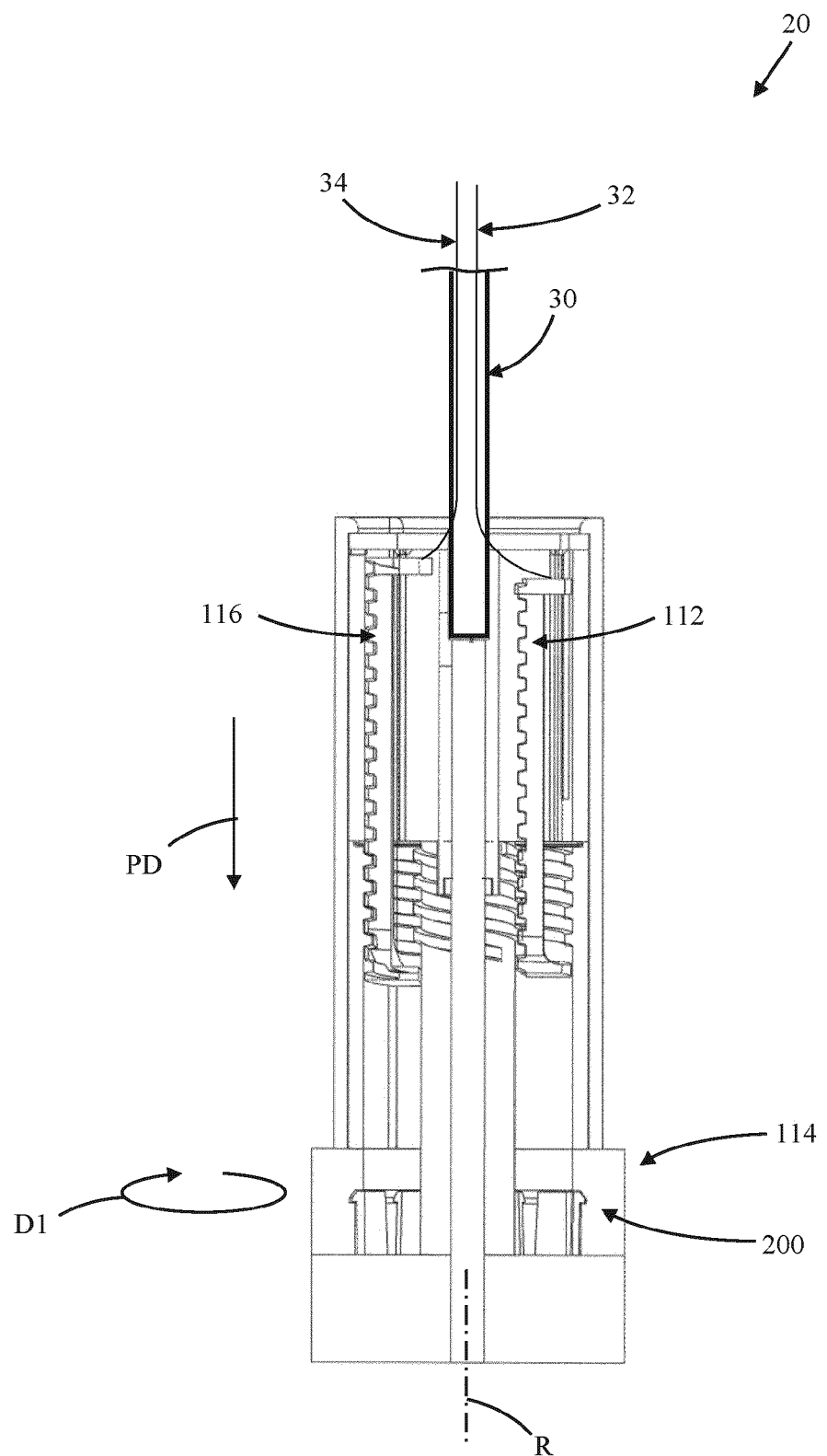
Figure 17B:
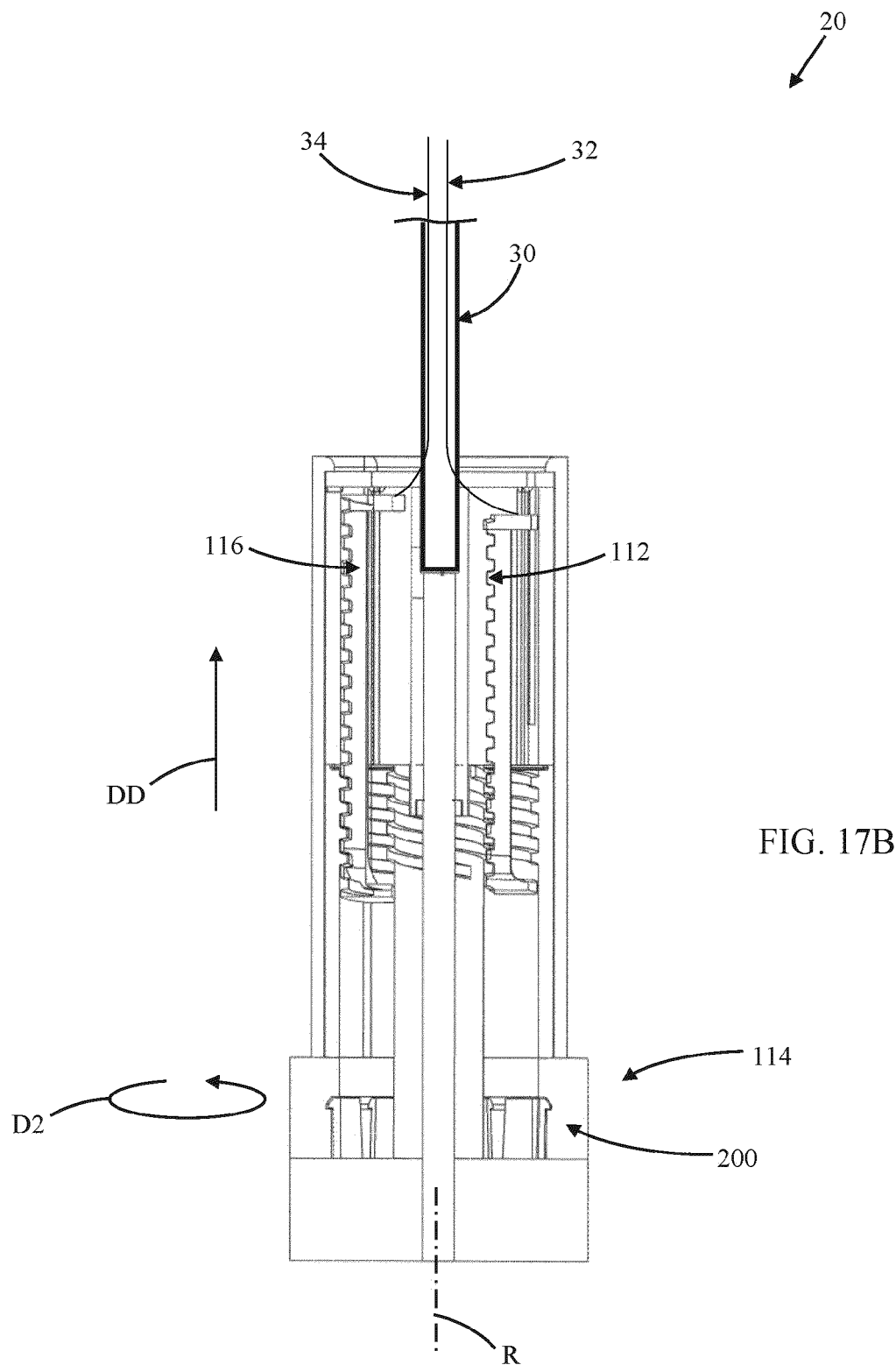

With reference to FIG. 17A, the clinician can rotate the second actuator member 114 (e.g., by grasping and turning the foot 200) about the axis of rotation R in a first rotational direction D1. Commensurate with the descriptions above, the second output member 116 is caused to move or translate linearly (e.g., parallel to the axis of rotation R) in a proximal direction (arrow PD) in response to rotation of the second actuator member 114 in the first rotational direction D1. Movement of the second output member 116 in the proximal direction PD applies a tension force onto the second steering wire 34. Tension in the second steering wire 34 is transferred to the catheter 30 at the point of attachment with the distal end of the second steering wire 34, for example at the distal region 42, as a pulling force. With additional reference to FIG. 2, the pulling force exerting by the second steering wire 34 causes the corresponding region of the catheter to move or articulate in the positive Y direction. Conversely, and with reference to FIG. 17B, the clinician can rotate the second actuator member 114 about the axis of rotation R in an opposite, second rotational direction D2, causing the second output member 116 to move or translate linearly in a distal direction (arrow DD). Movement of the second output member 116 in the distal direction DD decreases or lessens tension in the second steering wire 34, thus decreasing or lessening the pulling force being applied by the second steering wire 34 onto the catheter 30 at the point of attachment. With additional reference to FIG. 2, decreasing the pulling force exerting by the second steering wire 34 causes or allows the corresponding region of the catheter to move or articulate in the negative Y direction. The first output member 112 does not move with the above-described movements of the second output member 116 and thus a tension (if any) applied to the first steering wire 32 (as well as a pulling force, if any, being applied to the catheter 30 by the first steering wire 32) does not change.

The steerable catheter device and steering control units of the present disclosure provide a marked improvement over previous designs. The steering control units afford a clinician the ability to steer or articulate the catheter in at least two planes, with the steering control unit having a compact footprint that can, for example, be desirable for many end-use applications, such as an introducer. As compared to conventional designs providing single plane steering, the ability to steer the catheter in multiple planes allows the clinician much more control and accuracy over device placement and has the potential to reduce complications.

Although the present disclosure has been described with reference to preferred embodiments, workers skilled in the art will recognize that changes can be made in form and detail without departing from the spirit and scope of the present disclosure.

What is claimed is:
1. A steerable catheter device comprising:
 a catheter defining a distal region opposite a proximal region;
 first and second steering wires connected to the catheter and extending from the proximal region; and
 a steering control unit comprising:
  a first actuator member including a post defining a threaded external surface,
  a first output member threadably connected to the threaded external surface of the post, wherein the first output member defines screw threads on an inner face thereof, the screw threads of the first output member threadably engaged with the threaded external surface of the post,
  a second actuator member including a hub defining a passageway and a threaded internal surface,
  a second output member threadably connected to the threaded internal surface of the hub, wherein the second output member defines screw threads on an outer face thereof, the screw threads of the second output member threadably engaged with the threaded internal surface of the hub,
  wherein at least a portion of the post is disposed within the passageway, wherein the first and second actuator members are independently rotatable relative to one another, wherein the first output member translates with rotation of the first actuator member and the second output member does not translate with rotation of the first actuator member, and wherein the second output member translates with rotation of the second actuator member and the first output member does not translate with rotation of the second actuator member, wherein the first and second output members are disposed in the passageway of the hub between the post and the threaded internal surface of the hub, wherein the first output member includes a flange engaging a non-threaded interior surface of the hub to enable sliding of the flange along the non-threaded interior surface of the hub during translation of the first output member, wherein the second output member includes a flange engaging a non-threaded exterior surface of the post to enable sliding of the flange along the non-threaded exterior surface of the hub during translation of the second output member;

wherein the first steering wire is attached to the first output member so that translation of the first output member adjusts tension of the first steering wire, and wherein the second steering wire is attached to the second output member so that translation of the second output member adjusts tension of the second steering wire.

2. The steerable catheter device of claim 1, wherein the catheter defines a central axis, and further wherein relative to a plane perpendicular to the central axis, an adjustment in tension in the first steering wire articulates the distal region in a first direction and an adjustment in tension in the second steering wire articulates the distal region in a second direction perpendicular to the first direction.

3. The steerable catheter device of claim 1, wherein the first and second actuator members are independently rotatable about a common axis of rotation.

4. The steerable catheter device of claim 1, wherein the catheter device is configured such that the first output member linearly translates in response to rotation of the first actuator member about an axis of rotation.

5. The steerable catheter device of claim 4, wherein the catheter device is configured such that the second output member linearly translates in response to rotation of the second actuator member about the axis of rotation.

6. The steerable catheter device of claim 1, further comprising:
an outer tubular housing defining a central passage;
wherein at least a portion of the first actuator member, the first output member, the second actuator member, and the second output member are disposed within the central passage.

7. The steerable catheter device of claim 1, wherein the post defines a lumen.

8. The steerable catheter device of claim 1, wherein the first and second output members each comprise an incomplete gear body defining the corresponding screw threads, the incomplete gear body having a central angle of less than 180 degrees.

9. The steerable catheter device of claim 8, wherein the incomplete gear bodies are concentrically arranged within the passageway of the hub.

10. The steerable catheter device of claim 1, further comprising a collar connected to the first and second output members and configured to prevent rotation of the first and second output members with rotation of the first and second actuator members, respectively.

11. The steerable catheter device of claim 1, wherein the first and second actuator members are linearly fixed relative to one another.

12. A medical system comprising the steerable catheter device of claim 1 and an elongate medical device to be received in a delivery lumen of the steerable catheter device.

13. The medical system of claim 12, wherein the elongate medical device comprises a delivery system that carries an implant.

14. A steering control unit for a steerable catheter device including a catheter and first and second steering wires extending through and from the catheter, the steering control unit comprising:
a first actuator member including a post defining a threaded external surface;
a first output member threadably connected to the threaded external surface of the post, the first output member configured for attachment to the first steering wire, wherein the first output member defines screw threads on an inner face thereof, the screw threads of the first output member being threadably engaged with the threaded external surface of the post;
a second actuator member including a hub defining a passageway and a threaded internal surface; and
a second output member threadably connected to the threaded internal surface of the hub, the second output member configured for attachment to the second steering wire, wherein the second output member defines screw threads on an outer face thereof, the screw threads of the second output member being threadably engaged with the threaded internal surface of the hub;
wherein at least a portion of the post is disposed within the passageway;
wherein the first and second output members are disposed in the passageway of the hub between the post and the threaded internal surface of the hub;
wherein the first and second actuator members are independently rotatable relative to one another;
wherein the first output member translates with rotation of the first actuator member and the second output member does not translate with rotation of the first actuator member; and
wherein the second output member translates with rotation of the second actuator member and the first output member does not translate with rotation of the second actuator member;
wherein the first output member includes a flange engaging a non-threaded interior surface of the hub to enable sliding of the flange along the non-threaded interior surface of the hub during translation of the first output member;
wherein the second output member includes a flange engaging a non-threaded exterior surface of the post to enable sliding of the flange along the non-threaded exterior surface of the hub during translation of the second output member.

15. The steering control unit of claim 14, wherein the steering control unit is configured such that the first output member linearly translates in response to rotation of the first actuator member about an axis of rotation.

16. The steering control unit of claim 14, wherein the first and second output members each comprise an incomplete gear body defining the corresponding screw threads, the incomplete gear body having a central angle of less than 180 degrees.

17. The steering control unit of claim 16, wherein the incomplete gear bodies are concentrically arranged.

\* \* \* \* \*